United States Patent
Nakanishi et al.

(10) Patent No.: US 6,606,135 B2
(45) Date of Patent: Aug. 12, 2003

(54) OPTICAL LENS SYSTEM, IMAGE DISPLAY APPARATUS, MICRO-LENS ARRAY, LIQUID CRYSTAL DISPLAY DEVICE, AND LIQUID CRYSTAL DISPLAY APPARATUS OF PROJECTION-TYPE

(75) Inventors: Hiroshi Nakanishi, Yawata (JP); Takashi Shibatani, Kashihara (JP); Hiroshi Hamada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 117 days.

(21) Appl. No.: 09/964,520

(22) Filed: Sep. 28, 2001

(65) Prior Publication Data

US 2002/0039157 A1 Apr. 4, 2002

(30) Foreign Application Priority Data

Oct. 4, 2000 (JP) .................................... 2000-305383
Sep. 11, 2001 (JP) .................................... 2001-275677

(51) Int. Cl.$^7$ ...................... G02F 1/1335; G02F 1/1337
(52) U.S. Cl. .................. 349/95; 349/130; 349/106
(58) Field of Search .................. 349/95, 130, 106, 349/96, 15, 62

(56) References Cited

U.S. PATENT DOCUMENTS

| | | |
|---|---|---|
| 5,161,042 A | 11/1992 | Hamada |
| 5,521,725 A * | 5/1996 | Beeson et al. ................. 349/95 |
| 6,339,459 B1 * | 1/2002 | Ichikawa et al. .............. 349/95 |
| 6,351,334 B1 * | 2/2002 | Hsieh et al. ................... 349/95 |
| 6,359,664 B1 * | 3/2002 | Faris ............................. 349/15 |
| 6,474,827 B2 * | 11/2002 | Shinohara et al. ............ 349/95 |
| 6,513,953 B1 * | 2/2003 | Itoh .............................. 362/19 |

FOREIGN PATENT DOCUMENTS

| | | | | |
|---|---|---|---|---|
| EP | 409618 A2 * | 1/1991 | ......... | G02F/1/1335 |
| JP | 9-49925 A | 2/1997 | | |
| JP | 10-39118 A | 2/1998 | | |

* cited by examiner

*Primary Examiner*—John F. Niebling
(74) *Attorney, Agent, or Firm*—Nixon & Vanderhye, P.C.

(57) ABSTRACT

An optical lens system in accordance with the present invention is arranged so that, when the micro-lens has a curved surface satisfying an inequality of $(n2/n1) \times \sin(\theta max) \geq 1$, where n1 indicates an index of refraction of a medium constituting one side of the curved surface of the lens, n2 (n1<n2) indicates an index of refraction of a medium constituting the other side of the curved surface of the lens, θ indicates an incident angle of the light with respect to a plane-normal of the curved surface of the lens when the light from the light source is directed to the curved surface of the lens of the micro-lens from a side of the medium having the index of refraction of n2, and θ max indicates a maximum value of the angle θ in the curved surface of the micro-lens, the micro-lens array is provided so that the light from the light source is directed to the micro-lens from the side of the medium having the index of refraction of n1. When using such an optical lens system as an image display apparatus of projection-type, it is possible to obtain the bright projection image.

11 Claims, 15 Drawing Sheets

$n_2 > n_1$
$(n_2/n_1) \times \sin \theta \max > 1$

F I G. 1 3 (a)
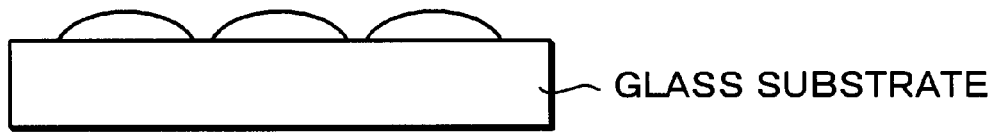
— GLASS SUBSTRATE
F I G. 1 3 (b)
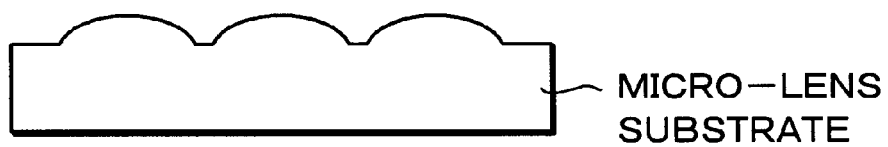
— MICRO-LENS SUBSTRATE
F I G. 1 3 (c)
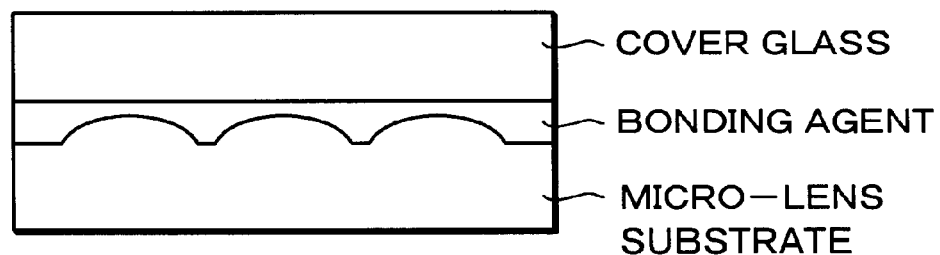
— COVER GLASS
— BONDING AGENT
— MICRO-LENS SUBSTRATE
F I G. 1 3 (d)
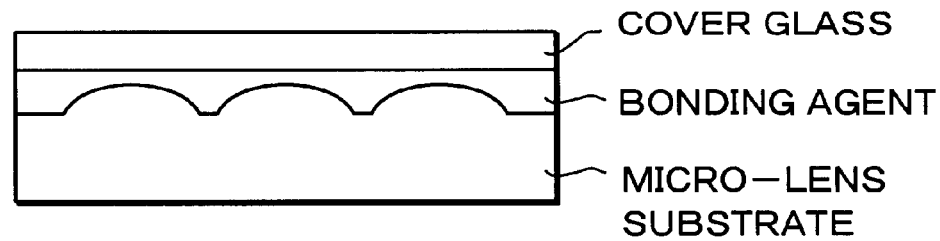
— COVER GLASS
— BONDING AGENT
— MICRO-LENS SUBSTRATE

MASTER

METAL STAMPER
MASTER

MICRO-LENS SUBSTRATE
METAL STAMPER

COVER GLASS
BONDING AGENT
MICRO-LENS SUBSTRATE

COVER GLASS
BONDING AGENT
MICRO-LENS SUBSTRATE

OPTICAL LENS SYSTEM, IMAGE DISPLAY APPARATUS, MICRO-LENS ARRAY, LIQUID CRYSTAL DISPLAY DEVICE, AND LIQUID CRYSTAL DISPLAY APPARATUS OF PROJECTION-TYPE

FIELD OF THE INVENTION

The present invention relates to an optical lens system which is provided with a light source and a micro-lens array in which micro-lenses to which the light is projected from the light source are provided in a two-dimensional manner and an image display apparatus using the optical lens system.

BACKGROUND OF THE INVENTION

In general, according to an image display apparatus having an image display device of non-emission-type, the transmittance (or the reflectance) of the image display device is changed in accordance with a driving signal (image signal) so that the intensity of the light that is projected from a light source to the image display device is modulated. The modulation allows the image and/or the characters to be displayed.

As such an image display apparatus, well known are (a) a direct-vision mode image display apparatus in which the image and/or the characters on the image display device are subjected to the direct-vision and (b) a projection mode image display apparatus in which the image and/or the characters on the image display device that have been enlarged and projected by a projection lens onto a screen are seen.

Further, as an image display device for use in the image display apparatus, listed are a liquid crystal display device, an electro chromic device, an EL (electro luminescence) device, a PDP (plasma display panel), and other devices. Among them, the liquid crystal display device has been widely used for devices such as a monitor, a projector, a portable information terminal, and a portable telephone.

In the liquid crystal display device, driving voltages are applied to respective pixel electrodes provided regularly in a matrix manner in accordance with image signal so that the optical property of the liquid crystal is changed. The changing of the optical property causes the displaying of the image and the characters.

As the way to apply the driving voltages to the respective pixel electrodes independently, well known are a simple matrix method and an active matrix method.

Among the methods, in the active matrix method, (a) switching devices such as MIM (metal-insulator-metal) devices acting as the non-linear two-terminal device and TFTs (thin film transistors) acting as the three-terminal device and (b) wiring electrodes for supplying the pixel electrodes with the driving voltages should be provided with respect to the liquid crystal display device.

The strong light incident on the device causes the device resistor in an OFF-state to be reduced so that the electric charges that have been charged during the voltage application are discharged and the proper voltage is not applied to a liquid crystal part that is located in a region where the switching device and the wiring electrode are provided. Under the circumstances, the following problem is raised. More specifically, since the display operation of the main body is not carried out, the leakage of the light occurs even in a black displaying state so as to reduce the contrast ratio.

In the case where the liquid crystal display device is of a transmission-type, in order to cut off the light directed to the region where the light that have earlier described should not be projected, it is necessary to provide light shield means referred to as a black matrix 1502 (a) on a TFT substrate which is provided with the switching devices and the pixel electrodes and/or (b) on an opposite substrate which is opposite to the TFT substrate via a liquid crystal layer, as shown in FIG. 11, for example.

Thus, according to the liquid crystal display device of transmission-type, in addition to a TFT 1501 acting as switching device having a shielding property, gate and source bus lines 1503 and 1504 acting as the wiring electrode having a shielding property, the black matrix 1502 acting as the light shielding means are involved in the light shielding. This causes the area of the effective pixel aperture section occupying in the block of the pixel, i.e., the aperture ratio, to be reduced.

Further, it is difficult to provide the foregoing switching device and the wiring electrode so as to have a size of not more than a predetermined scale. This is because the switching device and the wiring electrode respectively have the constraints relating to the electric performance and the manufacturing technique. This causes that the aperture ratio is further reduced as the pitch of the pixel electrodes becomes smaller in accordance with the high precision and miniaturization of the liquid crystal display device.

When the aperture ratio thus becomes small, since the amount of the light that transmits the liquid crystal display device is reduced, the problem of the shortage of the brightness occurs especially when the liquid crystal projector in which the small liquid crystal display panel made of the liquid crystal display device is subjected to the enlargement and projection to a big screen is used as the projection mode image display apparatus.

In view of the problem, realized is a method in which micro-lenses are used so as to converge the light onto the respective pixel aperture sections and so as to improve the effective aperture ratio of the liquid crystal display device.

For example, in Japanese unexamined patent publication No. 4-60538 (publication date: Feb. 26, 1992), disclosed is a projector of single plate-type in which the white light is directed to dichroic mirrors provided in a fan-shaped manner so that the white light is separated into the light beams of the respective colors R(red), G(green), and B(blue) and is directed at respective different angles to the micro-lens provided on the side of the light source of the liquid crystal display device. This ensures to converge the light beams onto the pixels corresponding to the respective colors.

Most micro-lenses are provided in an arrayed manner on the opposite substrate in the liquid crystal display device. For example, as shown in FIG. 12, the micro-lenses are arranged so that they are sandwiched between two glass substrates and refract the light between the grass and the resin or between the two kinds of resins. This ensures the converging effect.

This kind of micro-lens array (MLA) is manufactured in accordance with the process shown in FIGS. 13(*a*) through 13(*d*) or shown in FIGS. 14(*a*) through 14(*e*), for example.

First, in FIG. 13(*a*), the patterning of a photoresist is developed on a glass substrate, and the heat dripping is made so as to obtain a lens shape on the surface of the glass substrate. Then, in FIG. 13(*b*), the photoresist is subjected to the dry etching so as to transfer the shape of the photoresist onto the surface of the glass substrate, thereby obtaining a micro-lens substrate.

Subsequently, as shown in FIG. 13(c), a bonding agent causes a cover glass to be bonded by to the surface on the side of the micro-lens substrate where the lens is formed, the micro-lens substrate being a resultant of the process shown in FIG. 13(b). And, as shown in FIG. 13(d), the surface of the cover glass is polished so as to have a predetermined thickness, so that a micro-lens array for use in the liquid crystal display device is manufactured. The process is disclosed in Japanese unexamined patent publication No. 6-250002 (publication date: Sep. 9, 1994).

Another manufacturing method is as follows: first, as shown in FIG. 14(a), the patterning of a photoresist is developed on the glass substrate so as to prepare a master.

Next, as shown in FIG. 14(b), a metal stamper is prepared by using the master prepared in the process shown in FIG. 14(a). And, the shape of the micro-lens array is copied to the glass substrate by the metal stamper. Thus, a micro-lens substrate is prepared.

Then, as shown in FIG. 14(d), a bonding agent causes a cover glass to be bonded to the surface on the side, where the lens is formed, of the micro-lens substrate that has been prepared in the process shown in FIG. 14(c). Thereafter, as shown in FIG. 14(e), the surface of the cover glass is polished so as to have a predetermined thickness. Thus, a micro-lens array for use in the liquid crystal display device is manufactured.

In a direct-vision mode image display apparatus, the foregoing micro-lens array is used for improving the directivity by refracting the light projected from a backlight source to the front direction as disclosed for example in Japanese unexamined patent publication No. 10-39118 (publication data: Feb. 13, 1998) that is hereinafter referred to as a publication 1. Alternatively, the foregoing micro-lens array is used for relieving the dependency of the viewing angle of the liquid crystal display device by scattering the light that has transmitted through the liquid crystal display device as disclosed for example in Japanese unexamined patent publication No. 9-49925 (publication data: Feb. 18, 1997) that is hereinafter referred to as a publication 2.

Note that the micro-lens array is provided on the light incident side of the liquid crystal display device in the publication 1, and the micro-lens array is provided on the light reflection side of the liquid crystal display device in the publication 2.

By the way, the lens in general converges the light by use of the refraction function exerted in the interface of the media whose indexes of refraction are different from each other.

More specifically, in the case where the light directs to the medium whose index of refraction is smaller from the medium whose index of refraction is greater, when the incident angle of the light is great with respect to the plane-normal of the interface of the two media, the light is reflected from the interface without transmission. In contrast, as shown in FIG. 15, in the case where the light directs to the medium whose index of refraction is greater from the medium whose index of refraction is smaller, even when the incident angle of the light is great with respect to the plane-normal of the interface of the two media, the light transmits the interface. In FIG. 15, n1 and n2 (n1<n2) indicate the indexes of refraction, respectively, θ1 indicates an incident angle of the light directing from the medium whose index of refraction is n1 to the interface, θ2 indicates an refracted angle at which the light incident on the interface at an angle of θ1 is refracted in the medium whose index of refraction is n2. Note that n1×sin θ1=n2×sin θ2 is satisfied.

As has been described above, since most of the micro-lens arrays are arranged so that they are sandwiched between two glasses, the refraction of the light occurs in the interface between the glass and the resin or in the interface between the two resins.

When the micro-lens array is used in the liquid crystal projector acting as the projection mode image display apparatus, the light from the light source is converged onto the aperture section of the pixel so as to pass through the aperture section of the pixel, and is then diffused so that it is directed to the projection lens.

However, according to the conventional liquid crystal projector, since the value "F" of the projection lens is great (the receiving angle of the light is small), when the converging angle of the micro-lens array is great (the radius of curvature of the lens is small), the light, having a diffusion angle of greater than the receiving angle of the projection lens, among the light that has transmitted the aperture section of the pixel is cut off by the projection lens.

Accordingly, in the conventional liquid crystal projector, it is realized by the micro-lens that the total amount of the light that reaches the screen becomes the largest by considering the balance of the light that passes through the aperture section of the pixel and the light that is cut off by the projection lens. This results in that the radius of curvature of the respective lenses in the micro-lens array becomes relatively great and no total reflection in the periphery part of the lens occurs.

In order to reduce the light that is cut off by the projection lens, it is contrived to reduce the value "F" of the projection lens (enlarge the receiving angle of light) so as to enlarge the converging angle of the micro-lens. Namely, it is contrived to reduce the radius of curvature of the respective lenses of the micro-lens.

In contrast, in the foregoing liquid crystal projector, the quartz glass or "neo ceram" made by Nippon Electric Glass Co. Ltd., that has an index of refraction ranging from about 1.46 to 1.54, is used as the glass substrate used in the liquid crystal display device. The resin having an index of refraction ranging from about 1.38 to 1.6 is now available in general as the resin for bonding the micro-lens between the glass substrates.

When the indexes of refraction of the glass and resin and the radius of curvature of the lens are adjusted, it is possible to realize a micro-lens array having a target focal length.

The light is refracted at a greater angle in an interface between the two media as the difference of the indexes of refraction between the two media is greater. According to the combination of the glass and the resin, the difference of the indexes of refraction between them is about 0.2 at most. This makes it impossible for the lens to have an enough converging performance. In order for the lens to have an enough converging performance, it is necessary that the radius of curvature of the lens interface is small, i.e., the incident angle in the refraction interface is great.

When the radius of curvature of the lens of the micro-lens array is thus small, the incident angle of the light becomes greater in the periphery of the lens. And, when the incident angle is not less than a predetermined angle, the light reflection occurs in the periphery of the lens as has been described earlier. This causes that the light does not transmit the curved surface of the lens, so that the effect of the micro-lens is reduced. In this case, the condition that makes the light to reflect from the curved surface of the lens appears to satisfy the inequality: $(n2/n1) \times \sin \theta \geq 1$, where n1 and n2 (n1<n2) indicate the indexes of refraction of the media before and after the curved surface of the lens (see FIG. 16), respectively, and θ indicates an incident angle of the light.

For example, in the case of considering a lens in which the light is refracted and converged in the interface between a glass substrate having an index of refraction n2=1.54 and a resin having an index of refraction n1=1.38 in a 0.9-inch XGA (extended graphics array) panel having a pixel pitch of 18 μm, when the curved surface of the lens is not more than about 15 μm, the light is reflected in the periphery of the lens, provided that the parallelism of the illumination light is ±10°. This causes the problem that the lens effect of the micro-lens is reduced.

Thus, when the above micro-lens array is used, the amount of the light that transmits the micro-lens array is reduced in the liquid crystal projector acting as the projection mode image display apparatus. This causes the problem that it is not possible to obtain enough brightness.

In the case where a liquid crystal display apparatus adopting, for example, a micro-lens array as the direct-vision mode image display apparatus is used for improving the directivity by refracting the light projected from a backlight source to the front direction, when a micro-lens array in which the light is reflected in the periphery of the lens is used, the problems arise that the loss of the light occurs and the effect that improves the light directivity is weakened.

In the case of a liquid crystal display apparatus in which a micro-lens array is used for relieving the dependency of the viewing angle of a liquid crystal display device by scattering the light that has transmitted through the liquid crystal display device, when a micro-lens array in which the light is reflected in the periphery of the lens is used, the problems arise that the loss of the light occurs and the effect that improves the characteristic of the viewing angle of the liquid crystal display device is weakened.

The light reflected by the micro-lens includes the light that is reflected again by the member such as the surface of a substrate constituting the micro-lens array and is directed to the aperture section of a pixel other than the target pixels of the liquid crystal display device.

For example, in a liquid crystal display apparatus in which a black-and-white panel is used as the liquid crystal display device and the light having corresponding colors is separated and directed to the aperture sections of the respective pixels so as to carry out the color display, the amount of the foregoing light that has been reflected in the periphery of the lens is small. However, this indicates that the reflected light is directed not only to the pixels of the corresponding colors of the liquid crystal display device but also to the pixels corresponding to different colors. This causes the problem that the color purity is reduced due to the color mixture.

SUMMARY OF THE INVENTION

The present invention is made in view of the foregoing problems, and its object is to provide an optical lens system, an image display apparatus, a micro-lens array, a liquid crystal display device, and a liquid crystal display apparatus of projection-type that (1) have a micro-lens array made of minute lenses (micro-lenses) each of which has a curved surface satisfying a condition which allows the light to reflect in the periphery of the lens and (2) eliminates the reflection of the light in the periphery of the micro-lens so as to increase the amount of the light which transmits the micro-lens array for improving the lens effect, thereby ensuring (a) to obtain a bright projection image in a liquid crystal projector acting as a projection mode image display apparatus using the micro-lens array, (b) to obtain a display image with high color purity and without color mixture, (c) to improve the directivity of the light in a liquid crystal display apparatus acting as a direct-vision mode image display apparatus, and (e) to relieve the dependency of the viewing angle.

In order to achieve the above object, in an optical lens system in accordance with the present invention which is provided with a light source and a micro-lens array in which micro-lenses to which the light from the light source is directed are provided in a two-dimensional manner, when the micro-lens has a curved surface satisfying an inequality (1) of $(n2/n1) \times \sin(\theta max) \geq 1$, the micro-lens array is provided so that the light from the light source is directed to the micro-lens from the side of the medium having the index of refraction of n1, where n1 indicates an index of refraction of a medium constituting one side of the curved surface of the lens, n2 (n1<n2) indicates an index of refraction of a medium constituting the other side of the curved surface of the lens, θ indicates an incident angle of the light with respect to a plane-normal of the curved surface of the lens when the light from the light source is directed to the curved surface of the lens of the micro-lens from the side of the medium having the index of refraction of n2, and θ max indicates a maximum value of the angle θ in the curved surface of the micro-lens.

Since $\sin \theta \leq 1$ is satisfied, the inequality (1) is satisfied when the light is directed from the medium having a greater index of refraction to the medium having a smaller index of refraction. In this case, when the light having the incident angle θ which satisfies the inequality (1) is directed to the micro-lens, the light is reflected in the periphery that has a great incident angle θ.

In contrast, when the light is directed from the medium having a smaller index of refraction to the medium having a greater index of refraction, the term (n2/n1) becomes (n1/n2). This causes that no reflection occurs in the light refraction plane of the lens, even when the light incident angle becomes great.

This ensures to eliminate the reflection of the incident light in the periphery of the micro-lens. Accordingly, it is possible to increase the amount of the light projected from the micro-lens array.

Further, the arrangement may be as follows: More specifically, light separation means for separating the light of the light source into the respective light having wave lengths of red, green, and blue and for directing the respective light to the image display device at respective different angles is further included, the micro-lens array is provided between the light separation means and the image display device and is provided so that each of the micro-lenses constituting the micro-lens array corresponds to one of three pixel groups corresponding to the respective light having wave lengths of red, green, and blue.

With the arrangement, even in a projection mode image display apparatus adopting the optical lens system having the above arrangement, when the color image is subjected to the projection display, it is possible to obtain a bright color display image.

Accordingly, the arrangement may be as follows: More specifically, (a) the image display device, which modulates the light from the light source in accordance with the image signal, is provided on the side of a surface, from which the light is projected, of the micro-lens array in the optical lens system having the above arrangement, (b) the respective micro-lenses of the micro-lens array are provided so as to correspond to the respective pixels of the image display device, and (c) each micro-lens is provided so as to converge the light from the light source to a aperture section of its corresponding pixel.

Namely, the optical lens system having the above arrangement may be used in a liquid crystal projection as one of image display apparatuses of projection-type.

In this case, it is possible to converge the light from the light source to the pixel of the liquid crystal display device and to improve the effective aperture ratio, thereby ensuring to obtain the bright projection image.

Further, another micro-lens array in accordance with the present invention is provided with a micro-lens supporting substrate which has a plurality of micro-lens sections, on a first surface, each micro-lens section having a convex surface that becomes a micro-lens, and a cover glass bonded to the first surface of the micro-lens supporting substrate via a resin having an index of refraction which is smaller than that of the micro-lens section, the micro-lens supporting substrate being provided so that a second surface which is an opposite surface of the first surface is polished so as to have a predetermined thickness.

The thickness of the micro-lens supporting substrate is set so as to be equal to or less than a length between a surface of the lens and a point to which the light is converged by the micro-lens section.

A further micro-lens array in accordance with the present invention is arranged so as to satisfy an inequality (2) of $\sin(\theta \max) \geq (n4/n3)$, where n3 indicates an index of refraction of the micro-lens section, n4 indicates an index of refraction of the resin, $\theta$ max indicates a maximum angle between a plane-normal of a second surface of the micro-lens supporting substrate and a normal of a convex surface of the micro-lens section.

In this case, when the micro-lens array is provided so as to satisfy the inequality (2), it is possible to eliminate the reflection of the incident light in the periphery of the micro-lens, as has been described earlier. Accordingly, it is possible to increase the amount of the light projected from the micro-lens array.

In the case of a direct-vision mode liquid crystal display apparatus in which the liquid crystal display device is provided between the micro-lens array having the above arrangement and the light source as the image display device, since it is possible to diffuse the light projected from the liquid crystal display device more widely, it is possible to eliminate the loss of the light and to enhance the effect that improves the dependency of the viewing angle of the liquid crystal display device.

In the case of a direct-vision mode image display apparatus in which the liquid crystal display device is provided on the side of a surface from which the light is projected in the micro-lens array having the above arrangement, since the diffused light from the light source is effectively converted into the parallel light, it is possible to eliminate the loss of the light and to improve the directivity of the light.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinafter and the accompanying drawings that are given by way of illustration only, and thus, are not limitative of the present invention.

BRIEF DESCRIPTION OF THE DRAWINGS

FIG. 13(a) is a process diagram showing a process for forming a lens shape on the surface of a glass substrate.

FIG. 13(b) is a process diagram showing a process for obtaining forming a micro-lens substrate.

FIG. 13(c) is a process diagram showing a process for bonding a cover glass to the surface on which the lens of the micro-lens substrate is formed.

FIG. 13(d) is a process diagram showing a process for polishing the surface of the cover glass so as to have a predetermined thickness.

DESCRIPTION OF THE PREFERRED EMBODIMENTS

[First Embodiment]

The following description deals with an embodiment of the present invention. Note that the present embodiment deals with the case where an optical lens system in accordance with the present invention is used in a liquid crystal display apparatus of projection-type as a projection mode image display apparatus.

Figure 4:
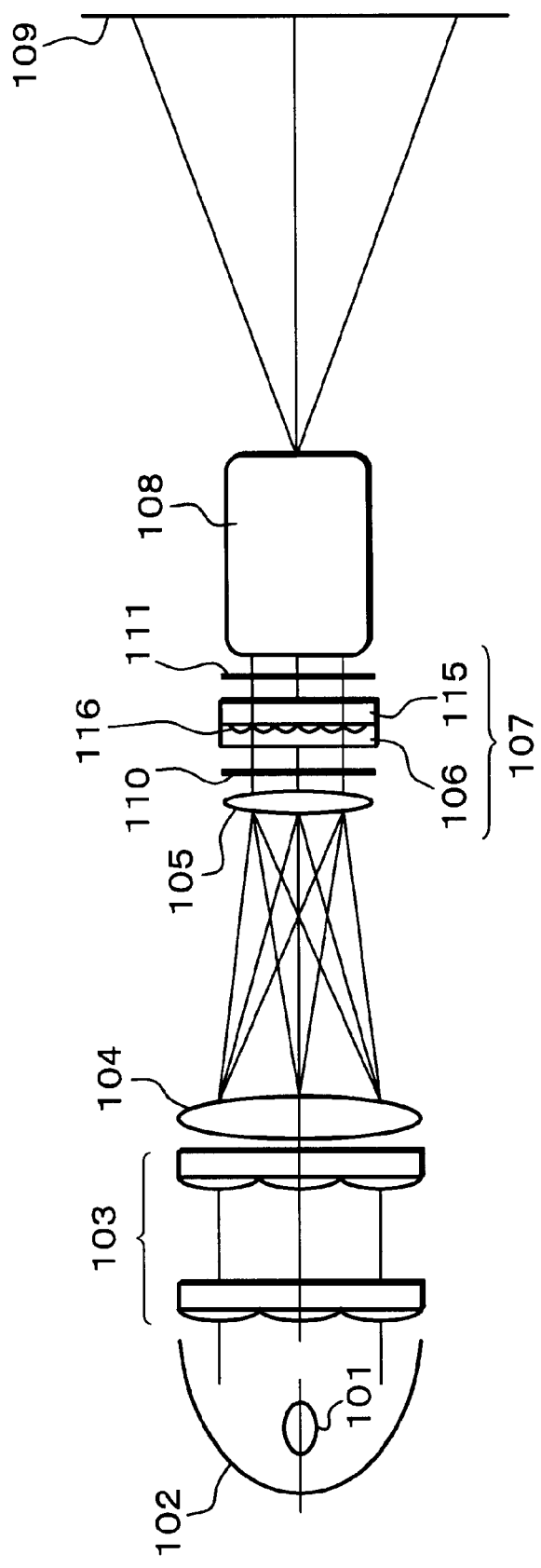
FIG. 4 shows an example of an image display apparatus in accordance with the present invention, and is a schematic diagram showing a structure of a liquid crystal display apparatus of projection-type using the liquid crystal display panel shown in FIG. 3(a).

The projection mode image display apparatus of the present invention, as shown in FIG. 4, is provided with a light source 101, a parabolic mirror 102, a fly-eye lens 103, a field lenses 104 and 105, a liquid crystal display panel (a liquid crystal display device) 107, and a projection lens 108.

As the light source 101 used in the liquid crystal display apparatus of projection-type having the above arrangement, for example, a UHP lump made by Philips Co., Ltd. with the electric rating of an output power of 120 W and an arc length of 1.4 mm. Note that, other than the UHP lump, it is possible to use a halogen lump, a xenon lump, or a metal halide lump as the light source 101.

The light from the light source 101 is made to be substantially parallel light by the parabolic mirror 102. Then, the parallel light passes through the fly-eye lens 103 and the field lenses 104 and 105, and further passes through the liquid crystal display panel 107 so that the image on the liquid crystal display panel 107 is enlarged and projected on a screen 109 by the projection lens 108.

The liquid crystal display panel 107 is provided with a polarizing plate 110, a micro-lens array 106, a TFT substrate 115, and a polarizing plate 111 in this order from the incident side of the light. Note that a liquid crystal layer (not shown) is provided between the micro-lens array 106 and the TFT substrate 115.

The light from the light source 101 is adjusted by the field lenses 104 and 105 so that the parallelism falls within a range of −15° and +15°. Then, the light is directed to the liquid crystal display panel 107. In this case, the incident light is converged to a aperture section of the pixel of the liquid crystal display panel 107 by the micro-lens array 106.

Thus, the parabolic mirror 102, the fly-eye lens 103, and the field lenses 104 and 105 constitute light incidence means for causing the light of the light source 101 to be directed to the micro-lens array 106, constituting the liquid crystal display panel 107, from the side of a cover glass 114 (later described).

As the liquid crystal display panel 107, an XGA panel of 0.9-inch having a pixel pitch of 18 μm is used. Note that the micro-lens array 106 is made of a plurality of micro-lenses (later described) and is arranged so that the micro-lenses correspond to the respective pixels of the liquid crystal display panel 107.

The liquid crystal display panel 107 is arranged so as to modulate the incident light in accordance with the image signal. The light that has been thus modulated is enlarged and projected on the screen 109 by the projection lens 108.

The following description deals with the micro-lens array 106.

Figure 1:
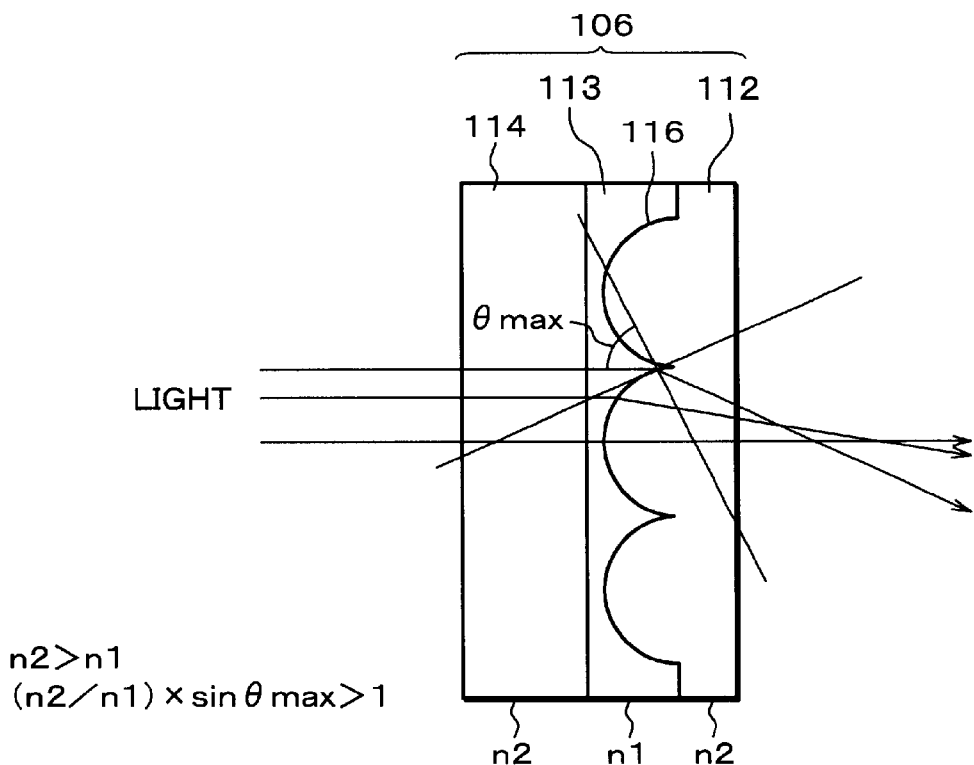
FIG. 1 is a schematic diagram showing a structure of a micro-lens array constituting an optical lens system in accordance with the present invention.

In the micro-lens array 106, as shown in FIG. 1, a cover glass 114 is bonded to a base glass 112 so as to be opposite to and a plurality of micro-lenses 116 (micro-lens section) by a bonding agent 113 made of resin. The micro-lenses 116, acting as minute lenses, are provided so as to have their convex surfaces on the first surface of the base glass 112 acting as the micro-lens supporting substrate.

The micro-lens array 106 is provided so as to have a curved surface that satisfies the following inequality (1).

$$(n2/n1) \times \sin(\theta max) \geq 1 \qquad (1)$$

In the inequality (1), n1 indicates an index of refraction of the bonding agent 113, n2 indicates an index of refraction of the base glass 112. And, the inequality (1) is satisfied, when n1<n2 is satisfied, in other words, in the case where the index of refraction n1 of the medium (the bonding agent 113) on the side of the convex surface of the curvature interface of the micro-lens 116 is smaller than the index of refraction n2 of the medium (the base glass 112) on the side of the concave surface, when the light is directed from the base glass 112 having the greater index of refraction to the bonding agent 113 having the smaller index of refraction, θ indicates an incident angle of the light with respect to a plane-normal of the curved surface of the lens when the light is directed to the curved surface of the micro-lens 116, and θ max indicates a maximum value of the angle θ in the curved surface of the micro-lens 116.

Figure 17:
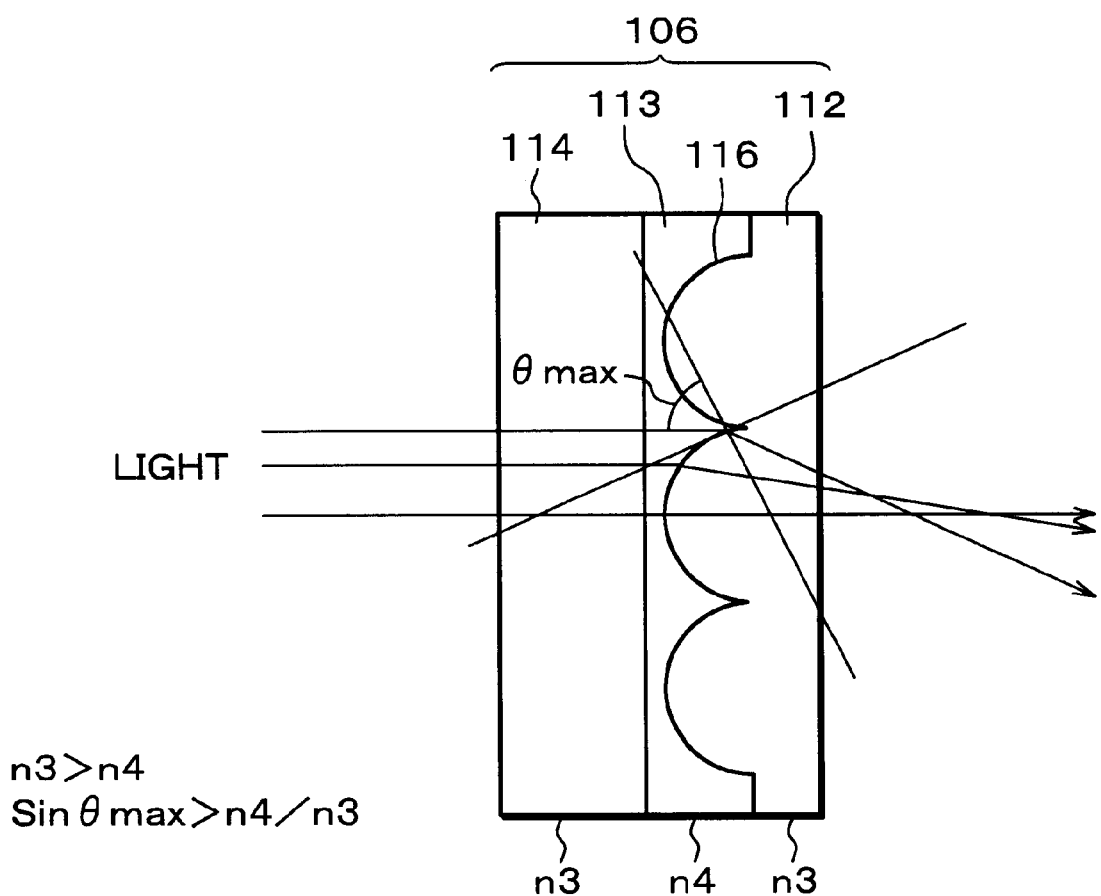
FIG. 17 is a schematic diagram showing a structure of a micro-lens array constituting another optical lens system in accordance with the present invention.

Note that the micro-lens array 106, as shown in FIG. 17, may be provided so as to satisfy an inequality (2).

$$\sin(\theta max) \geq (n4/n3), \qquad (2)$$

In the inequality (2), n3 indicates an index of refraction of the micro-lens 116 (the micro-lens section), n4 indicates an index of refraction of the bonding agent 113 (resin), θ max indicates a maximum angle between a plane-normal of a second surface of the base glass 112 and a normal of a convex surface of the micro-lens 116.

According to the present embodiment, as shown in FIG. 1, the light incident on the micro-lens array 106 is directed to the bonding agent 113 via the cover glass 114, and is further directed to the base glass 112. Namely, the light incident on the micro-lens 116 is first directed toward the base glass 112 (the medium having a greater index of refraction) from the side of the bonding agent 113 (the medium having a smaller index of refraction).

In this case, since the term (n1/n2) is substituted for (n2/n1), even when the angle between the plane-normal with respect to the curved surface of the lens and the light incident on the surface is great like the periphery of the micro-lens 116, it is possible to converge the incident light to the target pixel of the liquid crystal by transmitting the incident light without reflecting it in the periphery of the micro-lens 116.

Namely, the light source 101 and the micro-lens array 106 constitute an optical lens system in which the micro-lens array 106 is provided so that the light of the light source 101 is directed to the micro-lens 116 from the side of the bonding agent 113 (the medium having the index of refraction n1).

In the micro-lens array 106 having the above arrangement, the base glass 112 acts as an opposite substrate that is opposite to the TFT substrate 115 of the liquid crystal display panel 107 shown in FIGS. 3(a) and 3(b). The base glass 112 is provided with a transparent conductive layer and an alignment layer (both not shown). The TFT substrate 115 (active matrix substrate) is combined via a liquid crystal layer (not shown) with the base glass 112 so as to be opposite to the surface on which these layers are provided, thereby constituting a liquid crystal display device.

More specifically, the liquid crystal display apparatus of projection-type of the present embodiment (a) uses the liquid crystal display panel 107, (b) is arranged so that the light of the light source 101 is directed to the liquid crystal display panel 107 from the side of the cover glass 114, and is further provided with the projection lens 108 (projection means) that projects the light which has been modulated by the liquid crystal display panel 107 onto the screen 109. The liquid crystal display panel 107 is prepared as follows. At least the transparent conductive layer and the alignment layer are provided on the second surface that is the surface on the opposite side of the first surface. The second surface is the surface on which the micro-lenses 116 of the base glass 112 (micro-lens supporting substrate) constituting the micro-lens array 106 are not provided. The base glass 112 acts as the opposite substrate to which the TFT substrate 115 (active matrix substrate) is bonded and a liquid crystal medium is injected between the two substrates, thereby obtaining the liquid crystal display panel 107.

"neo ceram" made by Nippon Electric Glass Co. Ltd., that has an index of refraction of 1.54 (=n2) is used as the base glass 112 and the cover glass 114. The quartz glass "1737" can be also used as the base glass 112 and the cover glass 114. However, it is preferable to use the material that has a thermal expansion factor that is close to the base glass 112 (micro-lens substrate) and the TFT substrate 115 so as to avoid the shift of the pitches of the micro-lens and the TFT that is caused by the following factors ① and ②.

① In the manufacturing process of the liquid crystal display panel 107, when the base glass 112 and the TFT substrate 115 are combined with each other, there is a process that needs a temperature of not less than 100° C.

② Since the light having high illumination is directed to the liquid crystal display panel 107 during the actual projection, the temperature rise occurs in the liquid crystal display panel 107.

Note that the bonding agent 113 between the base glass 112 and the cover glass 114 that is used in the present embodiment is made of resin, and its index of refraction n1 is about 1.38.

Figure 2:
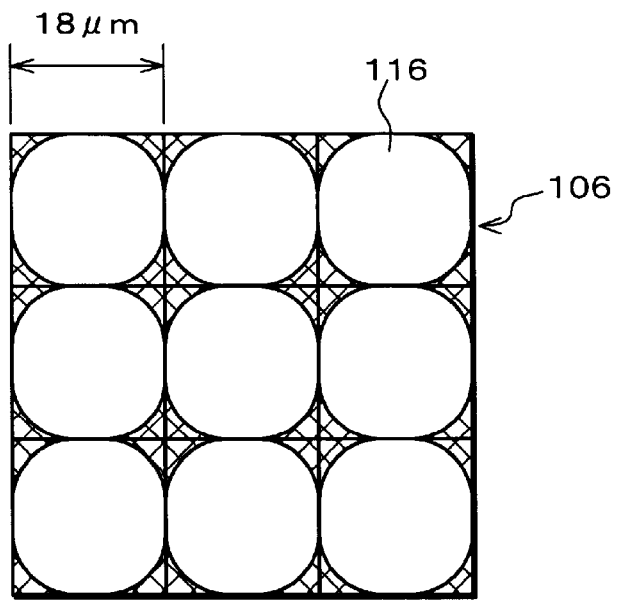
FIG. 2 is a front view of the micro-lens array shown in FIG. 1.

When a micro-lens array 106 having a focal length of about 90 μm is prepared under the above conditions, the radius of curvature of the micro-lens 116 is about 13 μm. When the light having a parallelism of ranging from −15° to +15° is directed to the micro-lens 116 having the above radius of curvature, as shown in FIG. 2, the light incident on the periphery (the meshed parts shown in FIG. 2) satisfies the foregoing inequality (1) Note that the above periphery corresponds to an area that has a distance of about not less than ±10.5 μm from the center of the micro-lens 116.

Samples 1 and 2 are prepared as follows. More specifically, the surface on the side of the base glass 112 of the micro-lens array 106 is polished so as to have a most suitable thickness of about 45 μm. The surface thus polished is combined with the TFT substrate 115. Thus, the sample 1 is prepared. In contrast, the surface on the side of the cover glass 114 of the micro-lens array 106 is polished so as to have the same condition as that of the sample 1. The surface thus polished is combined with the TFT substrate 115. Thus, the sample 2 is prepared. When the substantially parallel light is directed to the TFT substrate 115 from the side of the micro-lens array 106 of the respective samples 1 and 2, the light transmits as shown in FIGS. 3(a) and 3(b).

FIG. 3(a) shows how the light incident on the sample 1 transmits. As described above, since the light is directed to the base glass 112 that is the medium having a greater index of refraction from the side of the bonding agent 113 that is the medium having a smaller index of refraction, the incident light transmits and is converged to the target pixel of the liquid crystal display device without reflection in the periphery of the micro-lens 116, even in the case where the angle between the plane-normal of the curved surface and the light incident on the surface is great like the periphery of micro-lens 116.

In contrast, FIG. 3(b) shows how the incident light transmits the sample 2. Since the light is directed to the bonding agent 113 that is the medium having a smaller index of refraction from the side of the base glass 112 that is the medium having a greater index of refraction, the foregoing inequality (1) is satisfied as it is. This causes that the incident light is reflected in the periphery of the micro-lens 116 so as to reduce the amount of the light to be converged to the pixel of the liquid crystal display device, in the case where the angle between the plane-normal of the curved surface and the light incident on the surface is great like the periphery of micro-lens 116.

When the amount of the light incident on the sample 1 is equal to that on the sample 2, the light projected from the sample 1 shown in FIG. 3(a) is about 15% brighter than the light projected from the sample 2 shown in FIG. 3(b).

Accordingly, in the liquid crystal display panel 107 shown in FIG. 3(a), since the light of the light source 101 is not reflected in the peripheries of the respective micro-lenses 116 constituting the micro-lens array 106, it is possible to converge the light to the target pixel of the liquid crystal display device in the liquid crystal display panel 107.

This causes that the pixel of the liquid crystal display device in the liquid crystal display panel 107 can have a great effective aperture ratio. Accordingly, when the liquid crystal display panel 107 is used in the liquid crystal display apparatus of projection-type shown in FIG. 4, the image that is projected and displayed on the screen 109 becomes bright so as to improve the quality of display.

[Second Embodiment]

The following description deals with another embodiment of the present invention. Note that the present embodiment deals with the case where an optical lens system in accordance with the present invention is used in a liquid crystal display apparatus of projection-type acting as a projection mode image display apparatus.

Figure 5:
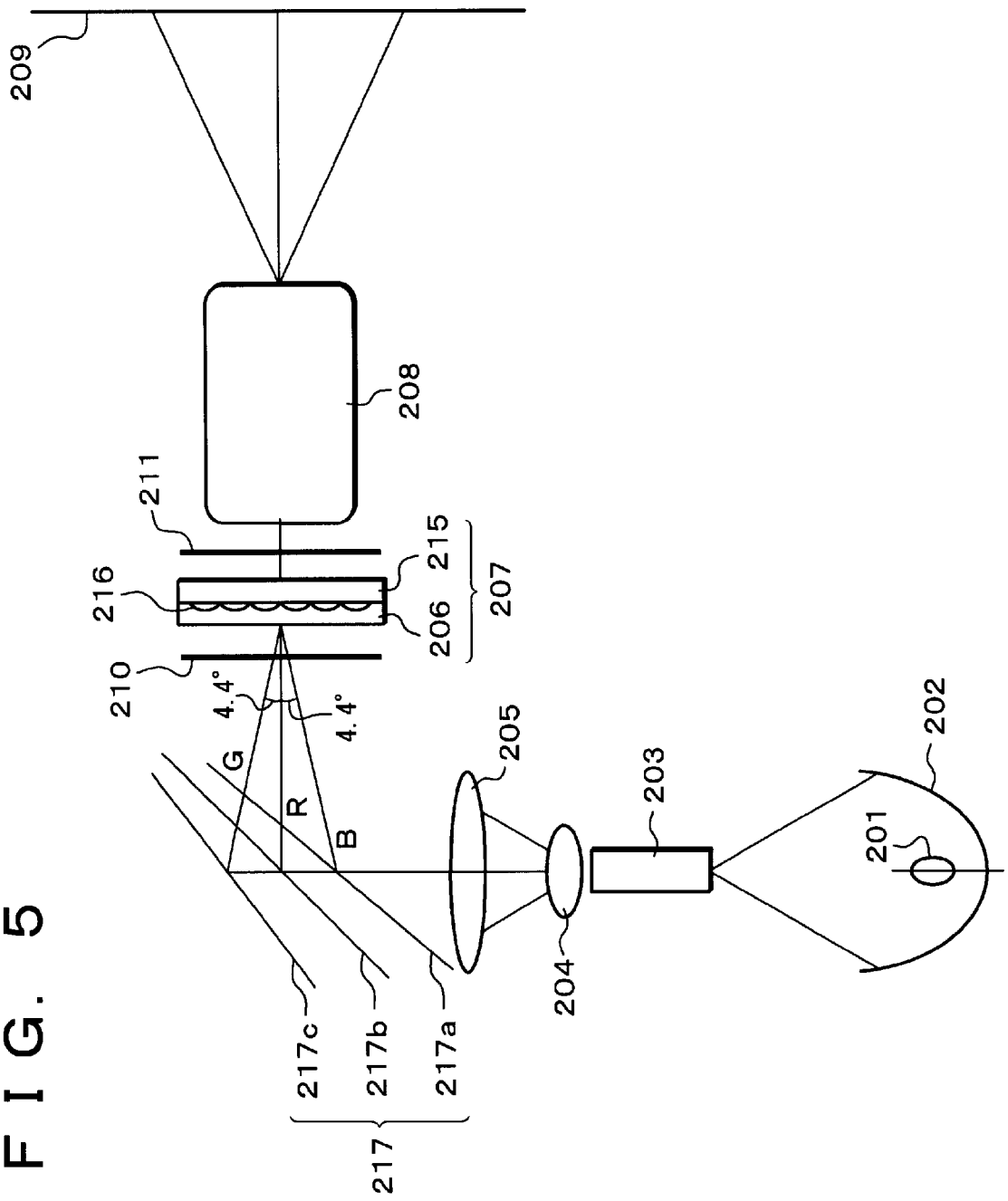
FIG. 5 is a schematic diagram showing a structure of a liquid crystal display apparatus of projection-type in accordance with another image display apparatus of the present invention.

A liquid crystal display apparatus of projection-type in accordance with the present embodiment, as shown in FIG. 5, is provided with a light source 201, an ellipse reflector 202, a glass rod 203, a convex lens 204, a collimator lens 205, a liquid crystal display panel 207, a projection lens 208, and a dichroic mirror group 217 (light separation means) between the collimator lens 205 and the liquid crystal display panel 207.

As the light source 201, like the foregoing first embodiment, a UHP lump made by Philips Co., Ltd. with the electric rating of an output power of 120 W and an arc length of 1.4 mm. Note that, other than the UHP lump, it is possible to use a halogen lump, a xenon lump, or a metal halide lump as the light source 201.

The light from the light source 201 is converged to the glass rod 203 by the ellipse reflector 202. In the glass rod 203, the incident light repeats the total reflection, and the distribution of the light illumination in a surface from which the light is projected is substantially uniform.

The light projected from the glass rod 203 is directed to the dichroic mirror group 217 via the convex lens 204 and the collimator lens 205.

In order to separate the light into the light of red, green, and blue colors, the dichroic mirror group 217 includes three dichroic mirrors, i.e., (a) a dichroic mirror 217a that only reflects the light of blue color and causes the light of red and green colors to transmit, (b) a dichroic mirror 217b that only reflects the light of red color and causes the light of green color to transmit, and (c) a dichroic mirror 217c that only reflects the light of green color are provided from the side which is closer to the collimator lens 205. The dichroic mirrors 217a through 217c reflect the light from the collimator lens 205 at respective different angles so as to direct to a single liquid crystal display panel 207. At this time, the image of the light projection surface of the glass rod 203 is formed on the surface of the liquid crystal display panel 207 via the convex lens 204 and the collimator lens 205.

Thus, the ellipse reflector 202, the glass rod 203, the convex lens 204, the collimator lens 205, and the dichroic mirror group 217 constitute light incidence means for directing the light of the light source 201 to the micro-lens array 206, constituting the liquid crystal display panel 207, from the side of the cover glass 214 (later described).

As the liquid crystal display panel 207, SVGA (Super Video Graphic Array) having 800×3×600 dots, a pixel pitch of 13.5 $\mu$m(H)×40.5 $\mu$m(V) is used.

The liquid crystal display panel 207 is provided with a micro-lens array 206 that is constituted by a plurality of micro-lenses 216 on the light incident side. The micro-lens array 206 is provided so that a single micro-lens 216 corresponds to three pixels for the R, G, and B colors. This causes the light from the dichroic mirror group 217 is converged to the aperture sections of the corresponding pixels, respectively.

The liquid crystal display panel 207 modulates the incident light in accordance with the image signal. The light thus modulated is enlarged and projected on the screen 209 by the projection lens 208.

The liquid crystal display panel 207 is provided with a polarizing plate 210, a micro-lens array 206, a TFT substrate 215, and a polarizing plate 211 in this order from the light incident side. Note that a liquid crystal layer (not shown) is provided between the micro-lens array 206 and the TFT substrate 215 so as to form a liquid crystal display device.

The following description deals with the micro-lens array 206 in detail.

As the micro-lens array 206, the arrangement similar to that of the foregoing first embodiment is adopted. More specifically, as the micro-lens array 206, as shown in FIGS. 7(a) and 7(b), a cover glass 214 is bonded to a base glass 212 so as to be opposite to a plurality of micro-lenses 216 (convex section) by a bonding agent 213 made of resin. The micro-lenses 216, acting as minute lenses, are provided so as to have their convex surfaces on the first surface of the base glass 212 acting as a transparent substrate.

The micro-lens array 206 is provided so as to have a curved surface that satisfies the following inequality (1).

$$(n2/n1) \times \sin(\theta\max) \geq 1 \qquad (1)$$

In the inequality (1), n1 indicates an index of refraction of the bonding agent 213, n2 indicates an index of refraction of the base glass 212. And, the inequality (1) is satisfied, when n1<n2 is satisfied, in other words, in the case where the index of refraction n1 of the medium (the bonding agent 213) on the side of the convex surface of the curvature interface of the micro-lens 216 is smaller than the index of refraction n2 of the medium (the base glass 212) on the side of the concave surface, when the light is directed from the base glass 212 having the greater index of refraction to the bonding agent 213 having the smaller index of refraction, $\theta$ indicates an incident angle of the light with respect to a plane-normal of the curved surface of the lens when the light is directed to the curved surface of the micro-lens 216, and $\theta$ max indicates a maximum value of the angle $\theta$ in the curved surface of the micro-lens 216.

More concretely, as the micro-lens array 206, used is a micro-lens array in which the respective micro-lenses 216 have a focal length of 175 $\mu$m, and the length between the micro-lens 216 and the aperture section of the pixel is set to 270 $\mu$m (175 $\mu$m in the air).

The light of the respective colors R, G, and B that are directed to the micro-lens array 206 having the above arrangement are set so that main light beams of the respective colors G and B are inclined at 4.4° to the incident angle of a main light beam of the light of the R color. Namely, the parallelism of the light which is directed to the liquid crystal display panel 207 is equal to ±2° (H)×4° (V). When this light is directed to the liquid crystal display panel 207, the peripheral area of the micro-lens 216, i.e., the meshed area shown in FIG. 6 having a distance of about not less than ±24 $\mu$m from the center of the micro-lens 216 satisfies the above inequality (1).

Samples 3 and 4 are prepared as follows. More specifically, the surface on the side of the base glass 212 of the micro-lens array 106 is polished so as to have a most suitable thickness of about 270 $\mu$m. The surface thus polished is combined with the TFT substrate 215. Thus, the sample 3 is prepared. In contrast, the surface on the side of the cover glass 214 of the micro-lens array 206 is polished so as to have the same condition as that of the sample 3. The surface thus polished is combined with the TFT substrate 215. Thus, the sample 4 is prepared. When the substantially parallel light is directed to the TFT substrate 215 from the side of the micro-lens array 206 of the respective samples 3 and 4, the light transmits as shown in FIGS. 7(a) and 7(b).

FIG. 7(a) shows how the light incident on the sample 3 transmits. As described above, since the light is directed to the base glass 212 that is the medium having a greater index of refraction from the side of the bonding agent 213 that is the medium having a smaller index of refraction, the incident light transmits and is converged to the target pixel of the liquid crystal display device without reflection in the periphery of the micro-lens 216, even in the case where the angle between the plane-normal of the curved surface and the light incident on the surface is great like the periphery of micro-lens 216.

In contrast, FIG. 7(b) shows how the incident light transmits the sample 4. Since the light is directed to the bonding agent 213 that is the medium having a smaller index of refraction from the side of the base glass 212 that is the medium having a greater index of refraction, the inequality (1) is satisfied as it is. This causes that the incident light is reflected in the periphery of the micro-lens 216 so as to reduce the amount of the light to be converged to the pixel of the liquid crystal display device, in the case where the angle between the plane-normal of the curved surface and the light incident on the surface is great like the periphery of micro-lens 216.

Figure 7:
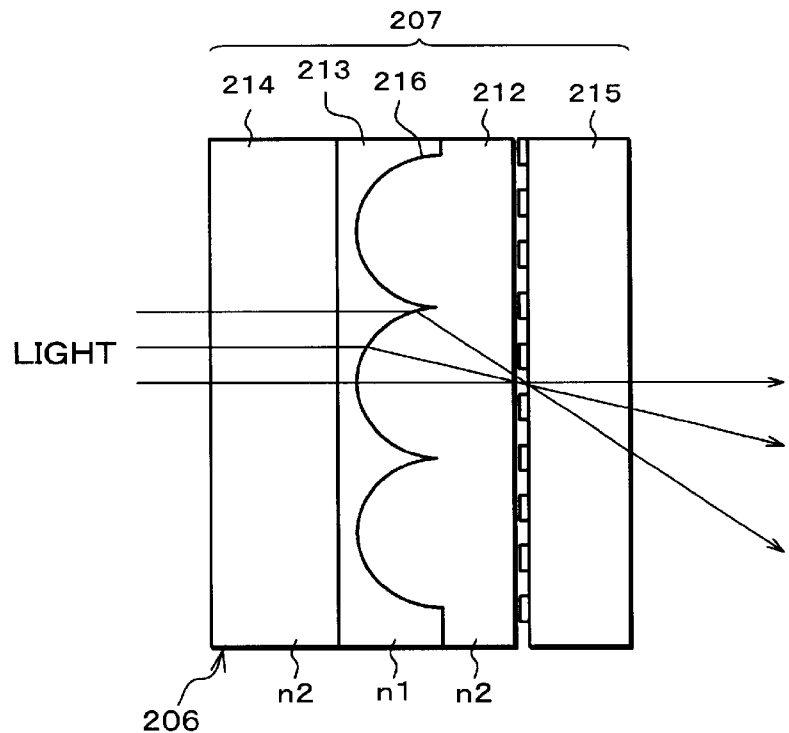
FIG. 7(a) is a schematic diagram showing a structure of a liquid crystal display panel that is arranged so that the light is directed to the medium having a great index of refraction from the medium having a small index of refraction in the micro-lens array.
FIG. 7(b) is a schematic diagram showing a structure of a liquid crystal display panel that is arranged so that the light is directed to the medium having a small index of refraction from the medium having a great index of refraction in the micro-lens array.
Figure 7:
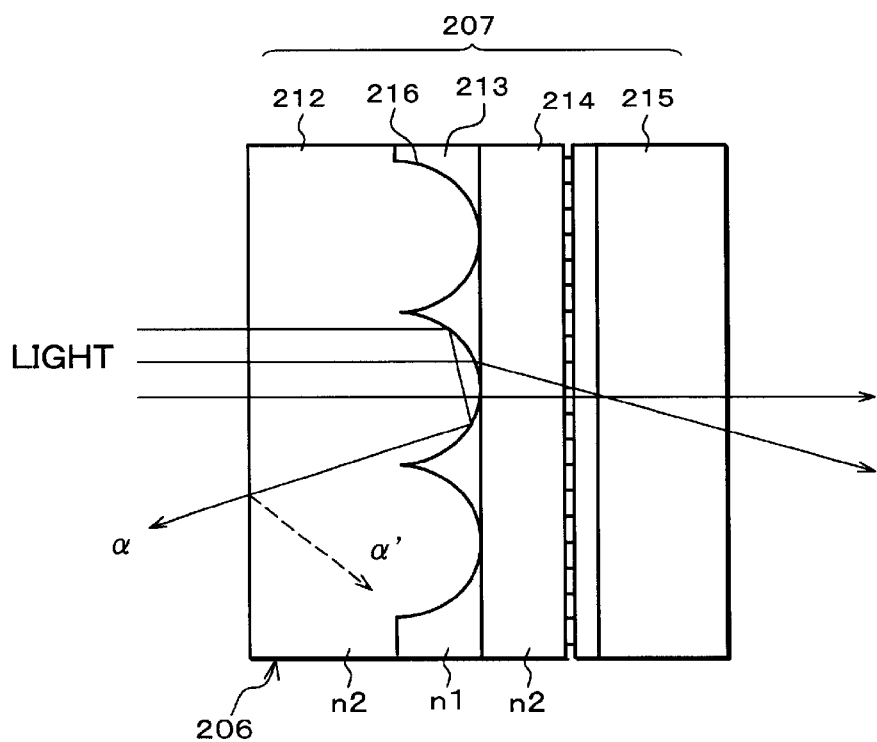

When the amount of the light incident on the sample 3 is equal to that on the sample 4, the light projected from the sample 3 shown in FIG. 7(*a*) is about 15% brighter than the light projected from the sample 4 shown in FIG. 7(*a*).

Accordingly, in the liquid crystal display panel 207 shown in FIG. 7(*a*), since the light of the light source 201 is not reflected in the peripheries of the respective micro-lenses 216 constituting the micro-lens array 206, it is possible to converge the light to the target pixel of the liquid crystal display device in the liquid crystal display panel 207.

This causes that the pixel of the liquid crystal display device in the liquid crystal display panel 207 can have a great effective aperture ratio. Accordingly, when the liquid crystal display panel 207 is used in the liquid crystal display apparatus of projection-type shown in FIG. 5, the image that is projected and displayed on the screen 209 becomes bright so as to improve the quality of display.

Figure 6:
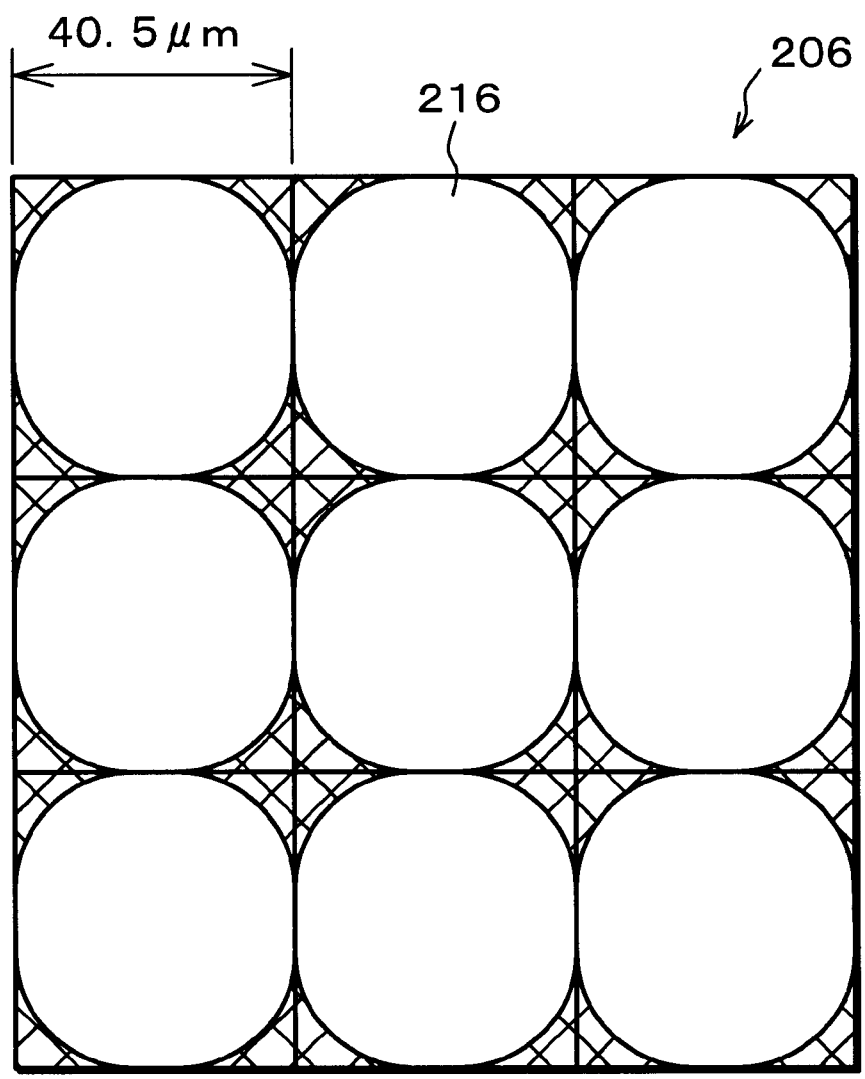
FIG. 6 is a front view of the micro-lens array for use in the liquid crystal display apparatus of projection-type shown in FIG. 5.

In the sample 4 shown in FIG. 7(*b*), the incident light is reflected in the peripheral area of the micro-lens 216 (the meshed area shown in FIG. 6). The reflected light (see the light α shown in FIG. 7(*b*)) is reflected again by the surface of the glass (the cover glass 214) and other member (see the light α' shown in FIG. 7(*b*)), so that the light α' is directed to a pixel that is different from the pixel of its corresponding color. This causes the color purity to deteriorate.

In contrast, in the sample 3 shown in FIG. 7(*a*), the incident light is not reflected in the peripheral area of the micro-lens 216. Accordingly, it does not occur that the light to be directed to the target pixel is reflected in the periphery of the micro-lens 216 and is then directed to a non-target pixel. This ensures to greatly reduce the harmful light that causes the color purity to be lowered so as to remarkably broaden the range of the color reproduction. This results in that the color reproducibility becomes more faithful and the display quality of the display image is greatly improved.

Note that the second embodiment deals with an example of the single-plate liquid crystal display apparatuses of projection-type in which a single liquid crystal display panel 207 has pixels of the respective colors R, G, and B so as to display the color image. The present invention is not limited to this. By adding a color separation and synthesis optical system to the liquid crystal display apparatus of projection-type of the first embodiment shown in FIG. 4 and by using a plurality of pieces of liquid crystal panels, the present invention can be adapted to a liquid crystal display apparatus of projection-type for displaying the color image, such as a three-plate liquid crystal display apparatus of projection-type having three pieces of liquid crystal display panels corresponding to the respective colors R, G, and B.

Figure 8:
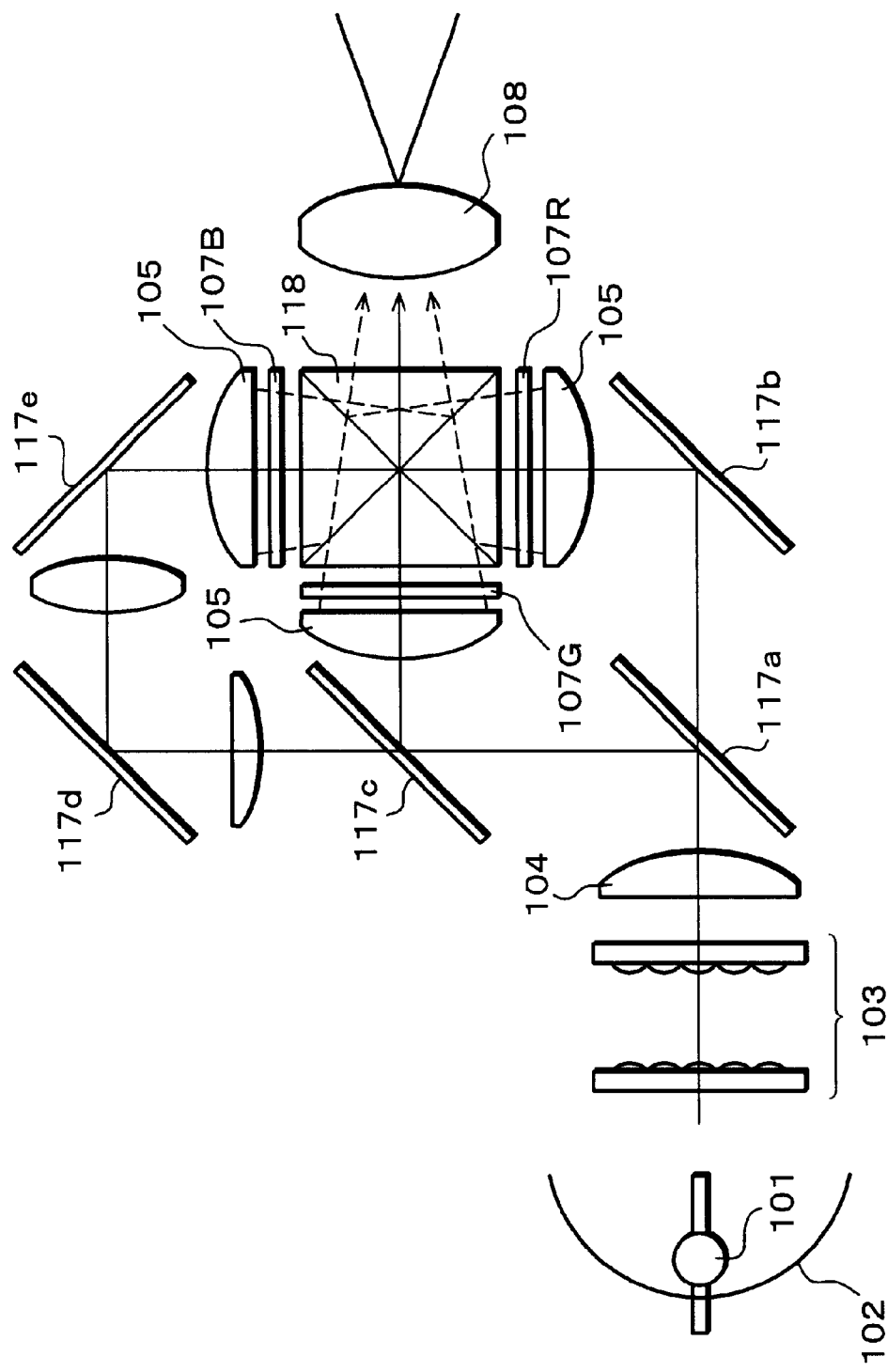
FIG. 8 is a schematic diagram showing a structure of a liquid crystal display apparatus of projection-type with three plates in accordance with a further image display apparatus of the present invention.

As such a three-plate liquid crystal display apparatus of projection-type, as shown in FIG. 8 for example, a liquid crystal display panel 107R, a liquid crystal display panel 107G, and a liquid crystal display panel 107B are provided so as to correspond to the three light of the respective R, G, and B colors. In each of the liquid crystal display panels 107R, 107G, and 107B, on its light incident side, a field lens is provided, and a plurality of dichroic mirrors 117*a* through 117*e*, acting as light separation means for the light of the light source is separated into the respective R, B, and B colors, are provided between the field lens 104 and the field lens 105. The three-plate liquid crystal display apparatus of projection-type is further provided with a synthesis optical system 118 that synthesizes the light which has been modulated by the respective liquid crystal display panels 107R, 107G, and 107B and directs the synthesized light to the projection lens 108.

Figure 3:
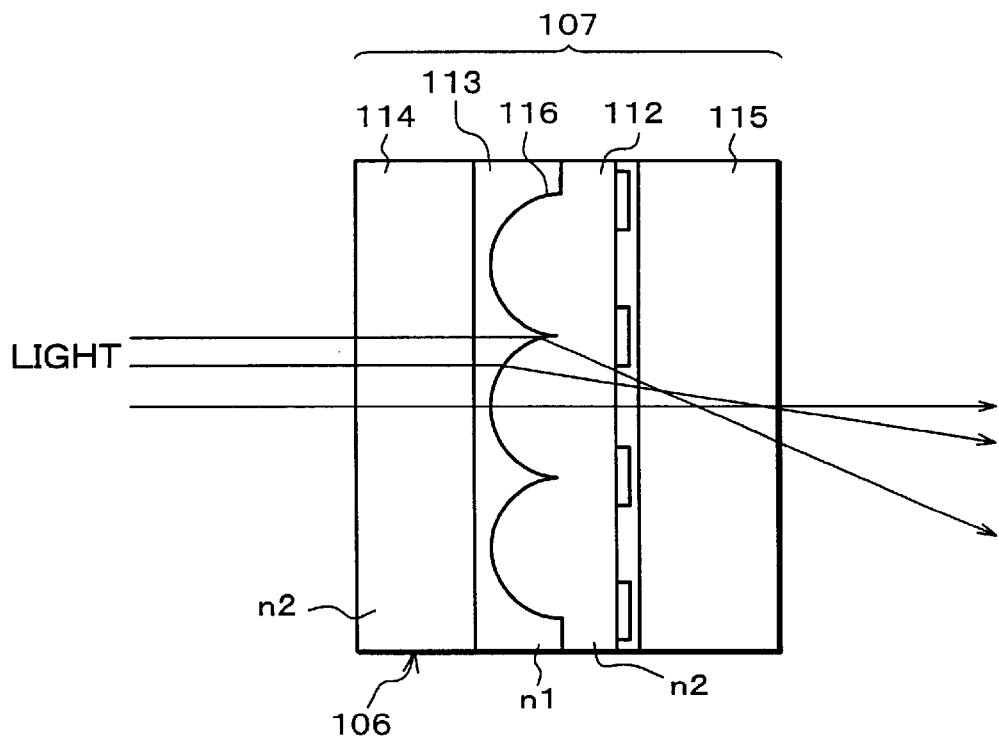
FIG. 3(a) is a schematic diagram showing a structure of a liquid crystal display panel that is arranged so that the light is directed to the medium having a great index of refraction from the medium having a small index of refraction in the micro-lens array.
FIG. 3(b) is a schematic diagram showing a structure of a liquid crystal display panel that is arranged so that the light is directed to the medium having a small index of refraction from the medium having a great index of refraction in the micro-lens array.
Figure 3:
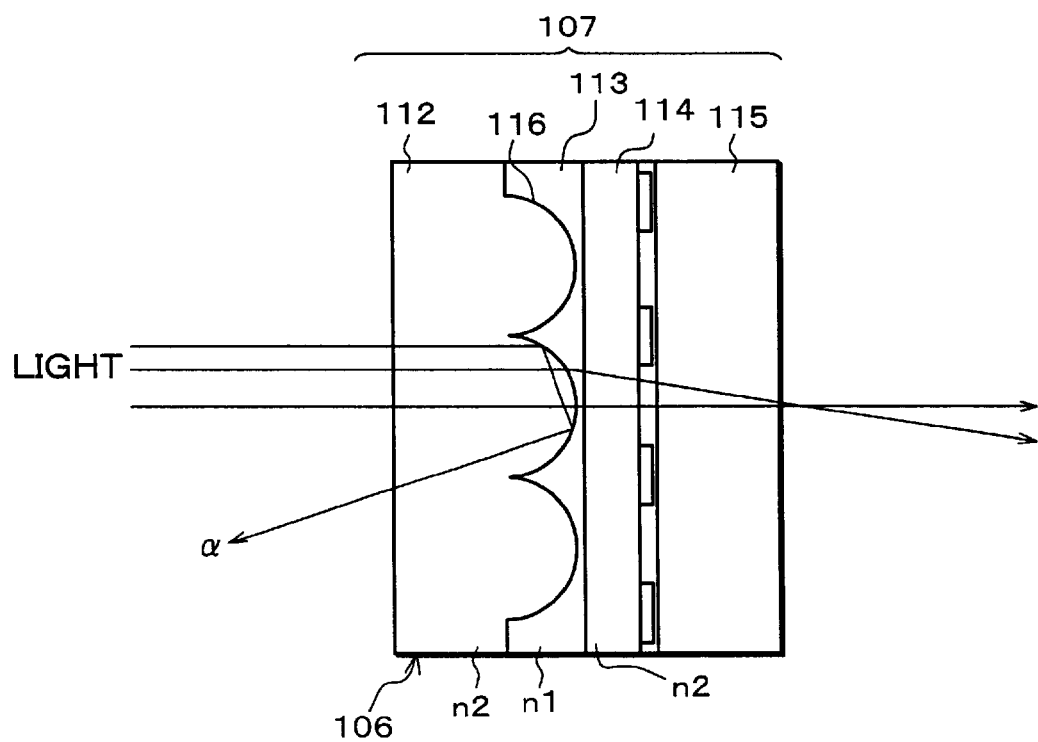

Even in the three-plate liquid crystal display apparatus of projection-type, the micro-lens array 106 (see FIG. 1) is provided so that it is arranged as shown in FIG. 3(*a*) in the liquid crystal display panels 107R, 107G, and 107B, respectively.

This causes the light projected from the respective liquid crystal panels to be directed to the synthesis optical system 118 without the reduction of the amount of the light, thereby ensuring that the projected image via the projection lens 108 is bright.

Each of the micro-lens array 106 used in the first embodiment and the micro-lens array 206 used in the second embodiment is only an example when applying the present invention to the embodiments, the present invention is not limited to the micro-lens arrays. For example, in a sandwich structure in which two kinds of resins whose indexes of refraction are different from each other are provided between the glasses, a micro-lens array may be provided in the interface of the sandwich structure.

Figure 18:
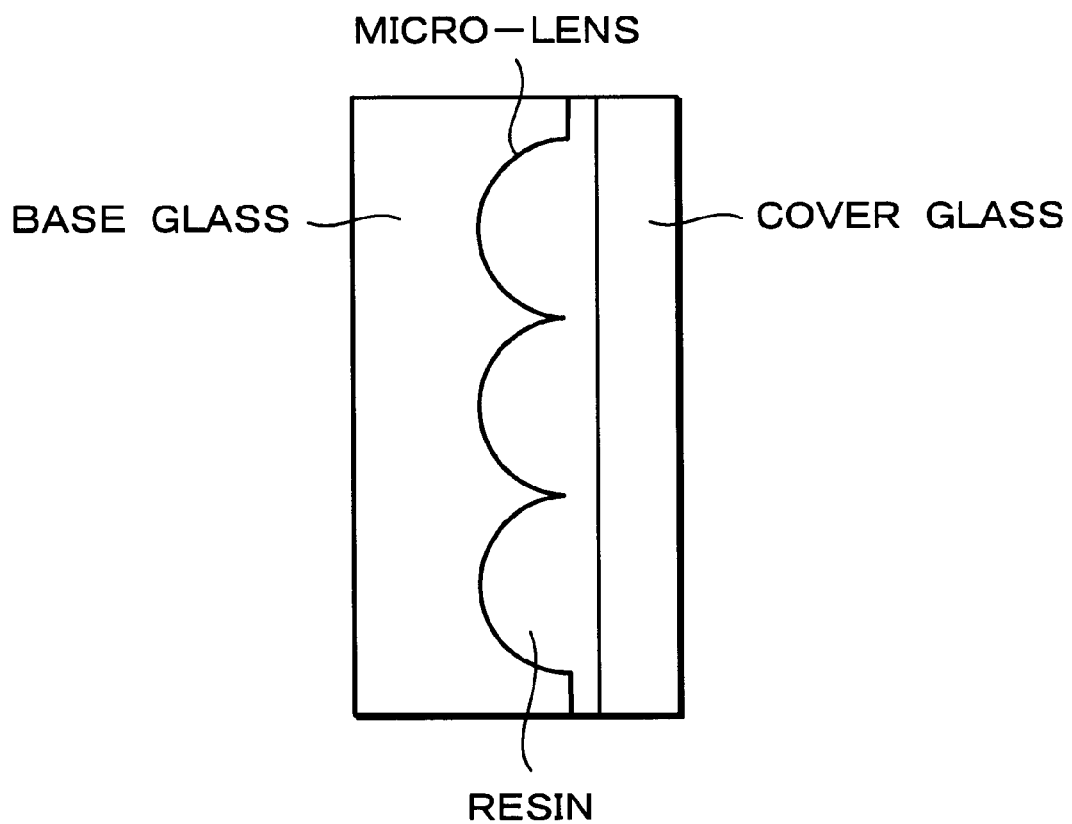
FIG. 18 is a schematic diagram showing a structure of a micro-lens array constituting a further optical lens system in accordance with the present invention.

According to the first and second embodiments, the convex shaped micro-lenses are provided on the respective base glasses 112 and 212, and the cover glasses 114 and 214 are combined with the micro-lenses via the resins whose indexes of refraction is smaller than the respective media constituting the micro-lenses. The present invention is not limited to this. As disclosed in Japanese unexamined patent publication No. 8-295583, a concave shaped micro-lens is provided in the base glass (see FIG. 18), and the cover glass is combined with the micro-lenses via the resin whose index of refraction is greater than the medium constituting the micro-lenses. This kind of micro-lens array may be substituted for the above micro-lenses.

The material constituting the micro-lens is not always needed to be the base glass itself. A structure in which a resin is provided on the base glass may be substituted.

The optimal thickness of the glass on the TFT side (the TFT substrates 115 and 215) of the micro-lens substrate (the base glasses 112 and 212) and each optimal focal length of the micro-lenses 116 and 216 vary depending on the specification of the panel to be used (the liquid crystal display panels 107 and 207) and the parallelism of the light incident on the panel.

The first and second embodiments deal with a liquid crystal display apparatus of projection-type. The present invention is not limited to this. The present invention can be applied to a liquid crystal display apparatus of direct-vision-type.

In order to improve the directivity of a backlight 301, the present invention can be applied to a liquid crystal display apparatus of direct-vision-type (see FIG. 9 for example) using the micro-lens array 106. In order to enlarge the viewing angle, the present invention can be also applied to a liquid crystal display apparatus of direct-vision-type (see FIG. 10) using the micro-lens array 106.

Figure 9:
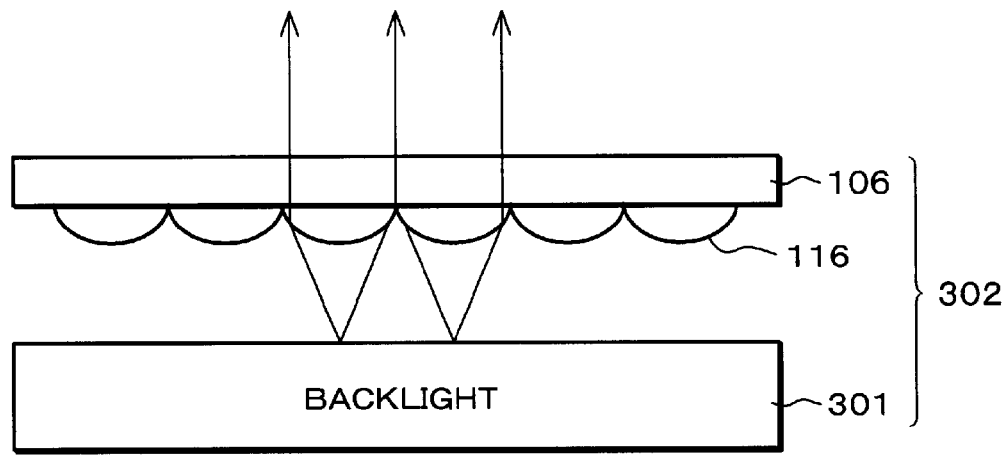
FIG. 9 is an explanatory diagram showing a still a further image display apparatus in accordance with the present invention.

According to the liquid crystal display apparatus of direct-vision-type shown in FIG. 9, provided is an optical lens system 302 that is constituted by the backlight 301 acting as a light source and the micro-lens 106 that is provided on the side from which the light is projected of the backlight 301. The light projected from the optical lens system 302 is directed to a liquid crystal display panel (not shown).

In the optical lens system 302, the diffused light that is projected from the backlight 301 is refracted to the front direction by the micro-lens array 106. This ensures to greatly improve the directivity of the light without the loss of the light. Since the light is not reflected in the periphery of the micro-lens 116 of the micro-lens array 106, the amount of the light transmitting the micro-lens 116 increases and the amount of the light directing to the liquid crystal display panel (not shown) from the optical lens system 302 increases.

Since the diffused light from the backlight 301 is converted into the parallel light by the micro-lens array 106 effectively, it is possible to improve the directivity of the light projected from the micro-lens array 106.

Thus, according to the liquid crystal display apparatus of direct-vision-type shown in FIG. 9, it is possible to eliminate the loss of the light from the optical lens system 302 and to greatly improve the directivity of the light. This ensures to carry out the bright image display.

Figure 10:
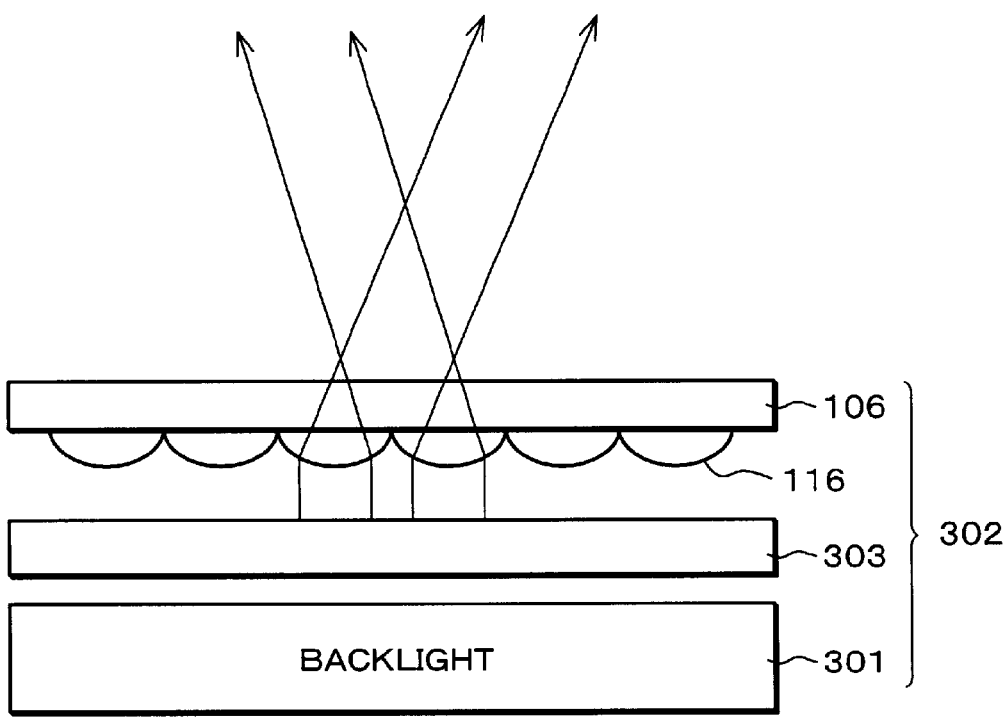
FIG. 10 is an explanatory diagram showing a yet further image display apparatus in accordance with the present invention.
Figure 11:
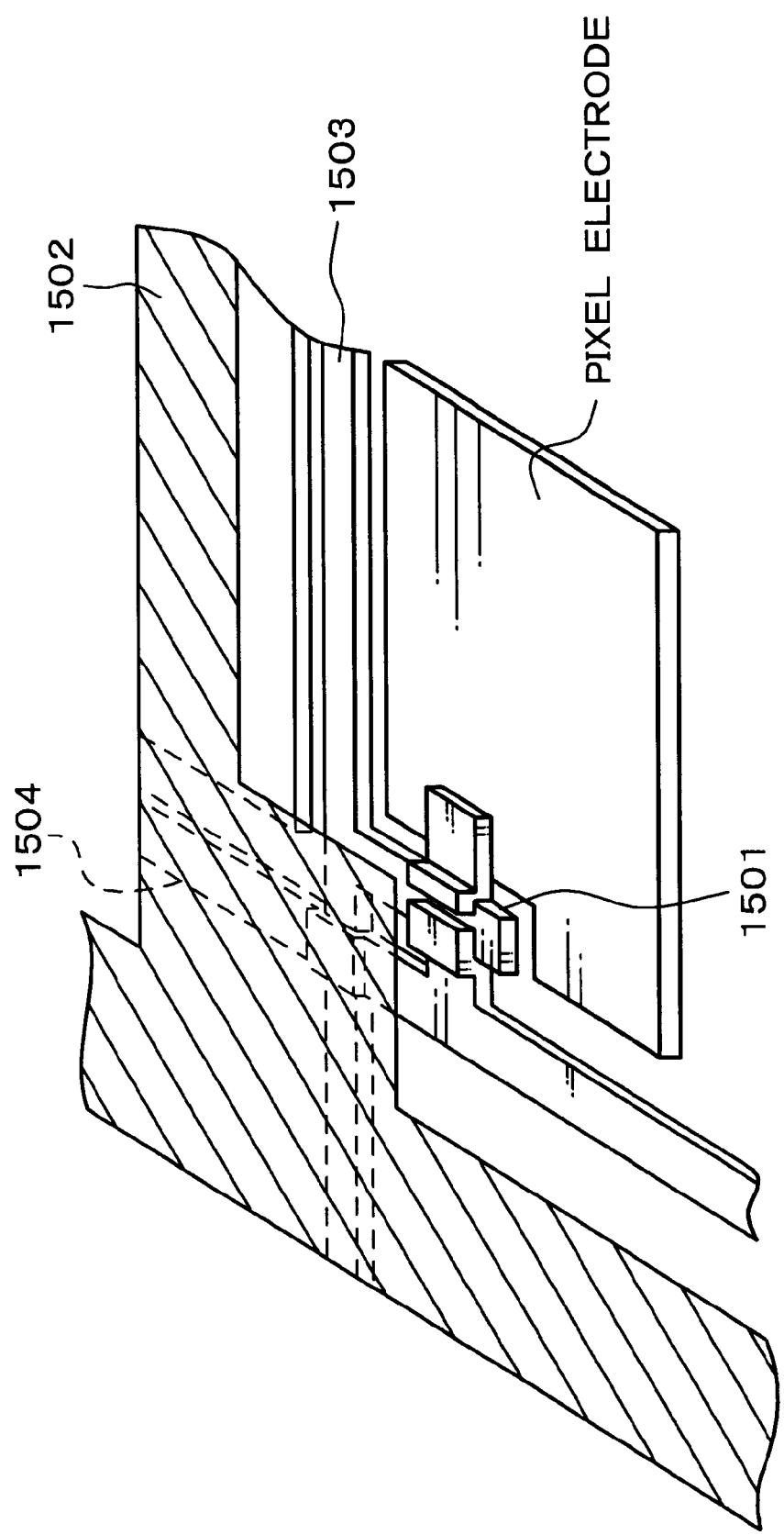
FIG. 11 is an explanatory diagram showing a pixel section of a liquid crystal display device.
Figure 12:
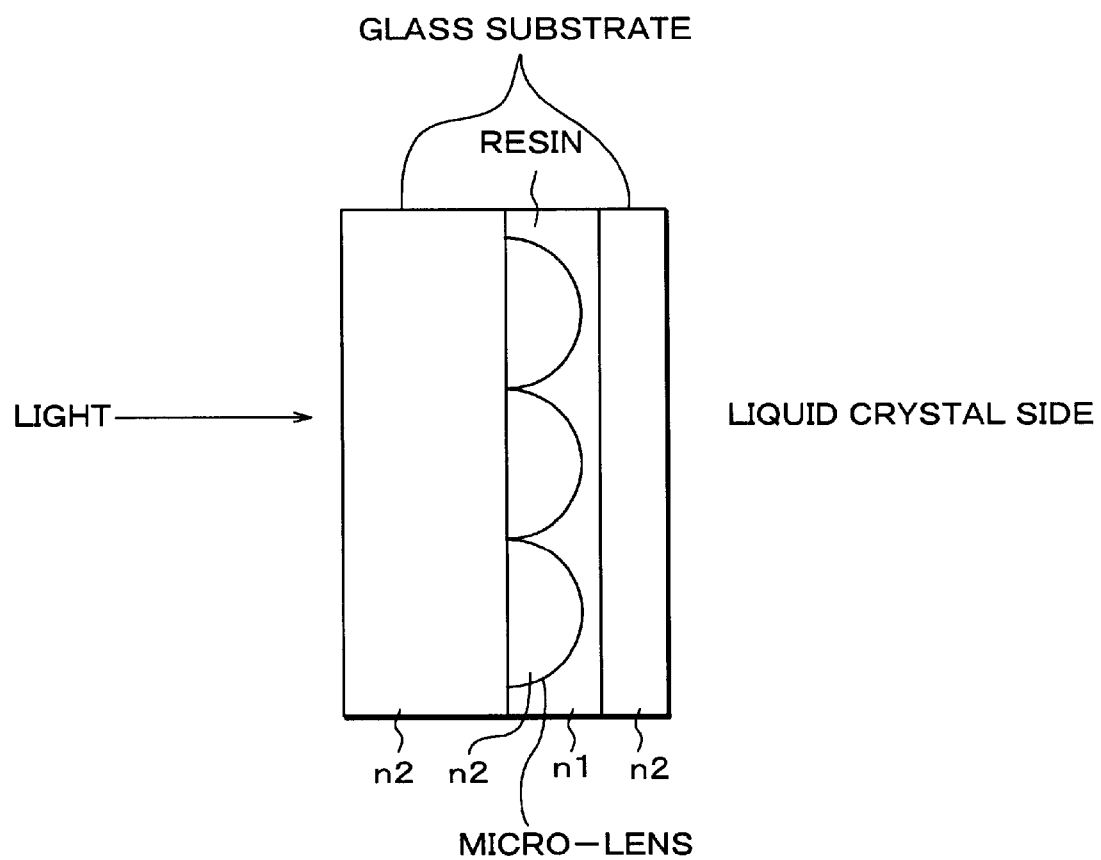
FIG. 12 is a schematic diagram showing a structure of a conventional micro-lens.
Figure 14A:
FIG. 14(a) is a process diagram showing a process for providing a master on the glass substrate.
Figure 14B:
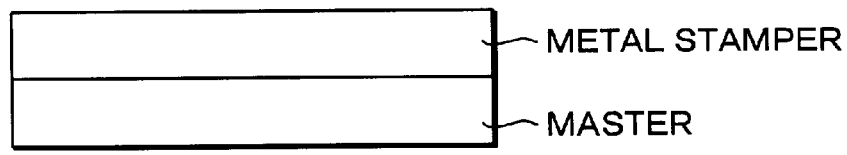
FIG. 14(b) is a process diagram showing a process for preparing a metal stamper by using the master on the glass substrate.
Figure 14C:
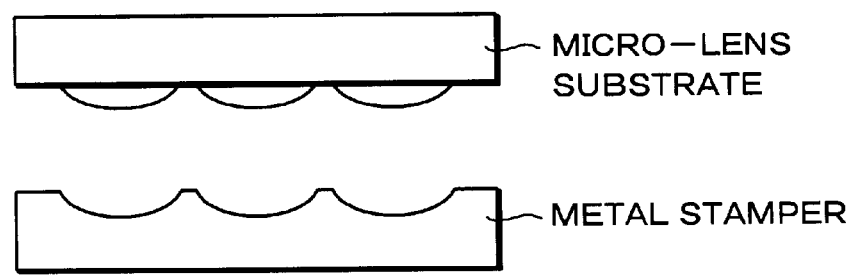
FIG. 14(c) is a process diagram showing a process for preparing a micro-lens substrate by the metal stamper.
Figure 14D:
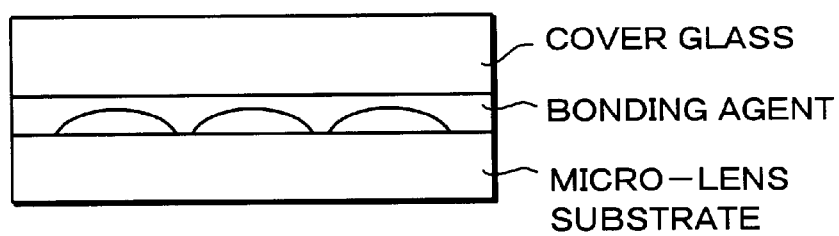
FIG. 14(d) is a process diagram showing a process for bonding a cover glass to the surface on which the lens of the micro-lens substrate is formed.
Figure 14E:
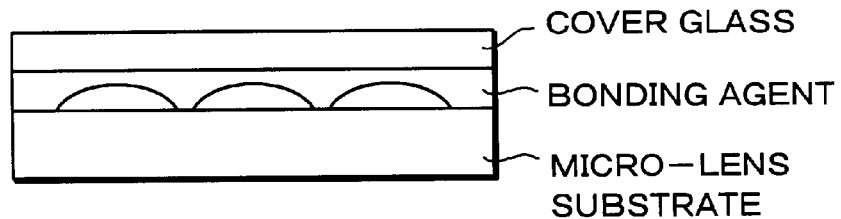
FIG. 14(e) is a process diagram showing a process for polishing the surface of the cover glass so as to have a predetermined thickness.
Figure 15:
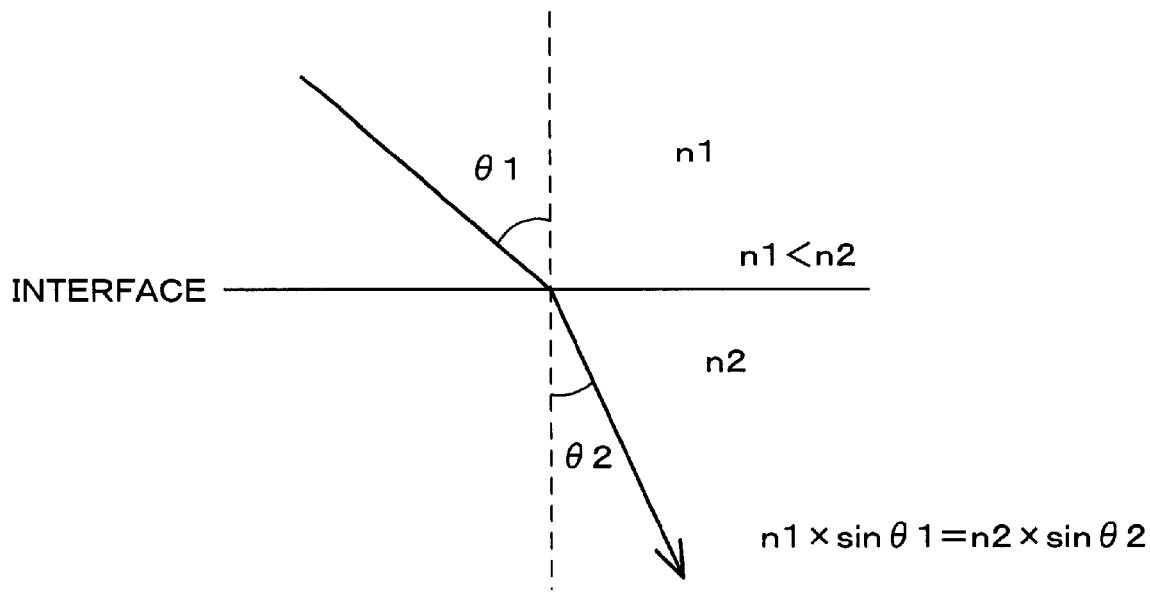
FIG. 15 is an explanatory diagram showing how the light is refracted in an interface.
Figure 16:
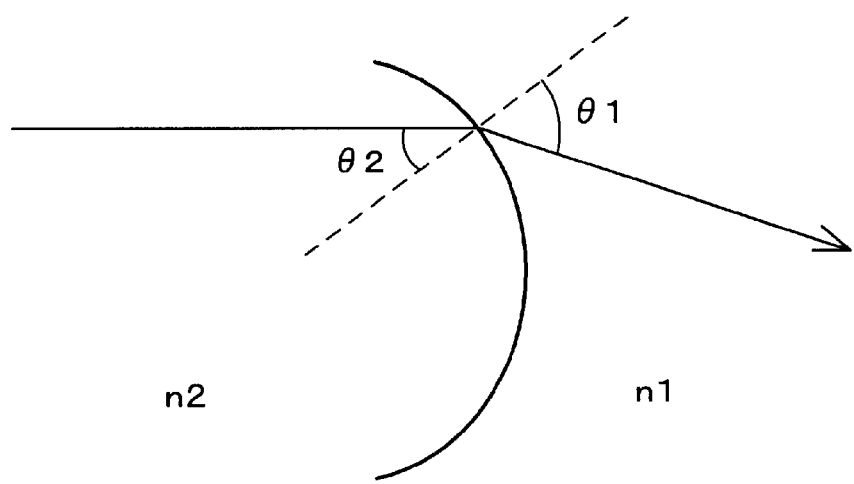
FIG. 16 is an explanatory diagram showing how the light is reflected in the periphery of the micro-lens.

According to the liquid crystal display apparatus of direct-vision-type shown in FIG. 10, provided are the backlight 301 acting as a light source and the micro-lens array 106 on the side from which the light is projected of the backlight 301, and a liquid crystal display device 303 between the micro-lens 106 and the backlight 301. Even in this case, the backlight 301 and the micro-lens array 106 constitute the optical lens system 302.

Namely, the liquid crystal display device 303 (acting as the image display device) is provided between the micro-lens 106 and the backlight 301 that constitute the optical lens system 302. In this case, the micro-lens array 106 causes the light projected from the liquid crystal display apparatus to diffuse more widely.

Accordingly, it is possible for the light projected from the liquid crystal display device 303 to be diffused by and to be projected from the micro-lens arrays 106 without being reflected in the periphery of the micro-lens 116. This ensures to scatter the light fully to the front direction of the micro-lens array 106 so as to enlarge the viewing angle.

Thus, it is possible to view the image in a good condition irrespective of the viewing angles of the liquid crystal display panel. Namely, it is ensured to greatly improve the dependency characteristic of the viewing angle among the display characteristics that the liquid crystal display panel generally has.

Further, according to the first and second embodiments, in the micro-lens arrays 106 and 206, spherical micro-lenses 116 and 216 are used. The present invention is not limited to this, provided that the micro-lenses 116 and 216 have a shape by which the light is refracted, such as a lens having a non-spherical shape and a pyramid shape.

Further, it is possible to manufacture the micro-lens array 106 as follows.

For example, in a micro-lens array in which (a) a micro-lens section having a plurality of convex surfaces on the first surface of a micro-lens supporting substrate is provided and (b) a cover glass is bonded to the micro-lens section via the resin (bonding resin) whose index of refraction is smaller than the micro-lens section, the second surface (the surface on the side where the micro-lens supporting substrate is not provided) is polished so as to have a predetermined thickness after the bonding of the cover glass.

The thickness of the micro-lens supporting substrate after the polishing is set so as to be equal to or less than a distance from the surface of the lens of the micro-lens section to a light converged point to which the light is converged by the micro-lens section.

Note that the light incident on the micro-lens array is converged by the micro-lens section (micro-lens) so that the light has a finite beam diameter, i.e., the light is not always converged to a point. In the present invention, the point, of the light beam that has been converged by the micro-lens section, which has the smallest diameter is referred to as the light converged point.

When forming a micro-lens that has a plurality of concave surfaces on the first surface of the micro-lens supporting substrate, a cover glass is bonded to the micro-lens section via the resin whose index of refraction is greater than the micro-lens section, and then the surface of the cover glass that is opposite to the surface on which the micro-lenses are provided is polished so as to have a predetermined thickness.

The thickness of the cover glass, like the micro-lens having the convex surfaces, is set so as to be equal to or less than a distance from the surface of the lens of the micro-lens section to a light converged point to which the light is converged by the micro-lens section.

The reason why the surface that should be polished differs between (a) the micro-lens, having the convex surfaces, in which the surface on the side of the micro-lens supporting substrate is polished and (b) the micro-lens, having the concave surfaces, in which the surface on the side of the cover glass is polished is based on the following fact. Namely, this is because the incident light is directed from the medium having a smaller index of refraction to the medium having a greater index of refraction with respect to the surface in which the light is refracted (the interface between the micro-lens and the resin) according to the present invention. In a convex lens, the transparent electrode and the alignment layer are generally provided on a surface, to be polished, of the micro-lens supporting substrate. In contrast, in a concave lens, the transparent electrode and the alignment layer are generally provided on a surface, to be polished, of the cover glass. With respect to each surface on which the transparent electrode and the alignment layer are provided, an active matrix substrate is combined, thus, a liquid crystal display panel is obtained.

At this time, the illumination light is incident on the side of the cover glass in the micro-lens having the convex surfaces and the illumination light is incident on the side of the micro-lens supporting substrate in the micro-lens having the concave surfaces.

As described earlier, an optical lens system in accordance with the present invention which is provided with a light source and a micro-lens array in which micro-lenses to which the light from the light source is directed are provided in a two-dimensional manner is arranged so that when the micro-lens has a curved surface satisfying an inequality: $(n2/n1) \times \sin(\theta\ max) \geq 1 \ldots (1)$, where n1 indicates an index of refraction of a medium constituting one side of the curved surface of the lens, n2 (n1<n2) indicates an index of refraction of a medium constituting the other side of the curved surface of the lens, θ indicates an incident angle of the light with respect to a plane-normal of the curved surface of the lens when the light from the light source is directed to the curved surface of the lens of the micro-lens from the side of the medium having the index of refraction of n2, and θ max indicates a maximum value of the angle θ in the curved surface of the micro-lens, the micro-lens array is provided so that the light from the light source is directed to the micro-lens from the side of the medium having the index of refraction of n1.

This ensures to eliminate the reflection of the incident light in the periphery of the micro-lens. Accordingly, it is possible to increase the amount of the light projected from the micro-lens array.

Accordingly, the arrangement may be as follows: More specifically, (a) the image display device, which modulates the light from the light source in accordance with the image signal, is provided on the side of a surface, from which the light is projected, of the micro-lens array in the optical lens system having the above arrangement, (b) the respective micro-lenses of the micro-lens array are provided so as to correspond to the respective pixels of the image display device, and (c) each micro-lens is provided so as to converge the light from the light source to a aperture section of its corresponding pixel.

Namely, the optical lens system having the above arrangement may be used in a liquid crystal projection as one of image display apparatuses of projection-type.

In this case, it is possible to converge the light from the light source to the pixel of the liquid crystal display device and to improve the effective aperture ratio, thereby ensuring to obtain the bright projection image.

Further, another micro-lens array in accordance with the present invention is provided with a micro-lens supporting substrate which has a plurality of micro-lens sections, on a first surface, each having convex a surface that becomes a micro-lens, and a cover glass bonded to the first surface of the micro-lens supporting substrate via a resin having an index of refraction which is lower than that of the micro-lens section, the micro-lens supporting substrate being provided so that a second surface which is an opposite surface of the first surface is polished so as to have a predetermined thickness.

The thickness of the micro-lens supporting substrate is set so as to be equal to or less than a length between a surface of the lens and a light converged point to which the light is converged by the micro-lens section.

A further micro-lens array in accordance with the present invention is arranged so as to satisfy an inequality: $\sin(\theta\ max) \geq (n4/n3)$ . . . (2), where $n3$ indicates an index of refraction of the micro-lens section, $n4$ indicates an index of refraction of the resin, and $\theta$ max indicates a maximum angle between a plane-normal of a second surface of the micro-lens supporting substrate and a normal of a convex surface of the micro-lens section.

In this case, when the micro-lens array is provided so as to satisfy the inequality (2), it is possible to eliminate the reflection of the incident light in the periphery of the micro-lens, as has been described earlier. Accordingly, it is possible to increase the amount of the light projected from the micro-lens array.

In the case of a direct-vision mode liquid crystal display apparatus in which the liquid crystal display device is provided between the micro-lens array having the above arrangement and the light source as the image display device, since it is possible to diffuse the light projected from the liquid crystal display device more widely, it is possible to eliminate the loss of the light and to enhance the effect that improves the dependency of the viewing angle of the liquid crystal display device.

In the case of a direct-vision mode image display apparatus in which the liquid crystal display device is provided on the side of a surface from which the light is projected in the micro-lens array having the above arrangement, since the diffused light from the light source is effectively converted into the parallel light, it is possible to eliminate the loss of the light and to improve the directivity of the light.

There are described above novel features which the skilled man will appreciate give rise to advantages. There are each independent aspects of the invention to be covered by the present application, irrespective of whether or not they are included within the scope of the following claims.

What is claimed is:

1. An optical lens system, comprising a light source and a micro-lens array in which micro-lenses to which the light from the light source is directed are provided in a two-dimensional manner is arranged so that, when the micro-lens has a curved surface satisfying an inequality of $(n2/n1) \times \sin(\theta\ max) \geq 1$, the micro-lens array is provided so that the light from the light source is directed to the micro-lens from the side of the medium having an index of refraction of n1, where n1 indicates an index of refraction of a medium constituting one side of the curved surface of the lens, n2 (n1<n2) indicates an index of refraction of a medium constituting the other side of the curved surface of the lens, $\theta$ indicates an incident angle of the light with respect to a plane-normal of the curved surface of the lens when the light from the light source is directed to the curved surface of the lens of the micro-lens from a side of the medium having the index of refraction of n2, and $\theta$ max indicates a maximum value of the angle $\theta$ in the curved surface of the micro-lens.

2. An image display apparatus, comprising a light source and a micro-lens array in which micro-lenses to which the light from the light source is directed are provided in a two-dimensional manner is arranged so that, when the micro-lens has a curved surface satisfying an inequality of $(n2/n1) \times \sin(\theta\ max) \geq 1$, where n1 indicates an index of refraction of a medium constituting one side of the curved surface of the lens, n2 (n1<n2) indicates an index of refraction of a medium constituting the other side of the curved surface of the lens, $\theta$ indicates an incident angle of the light with respect to a plane-normal of the curved surface of the lens when the light from the light source is directed to the curved surface of the lens of the micro-lens from a side of the medium having the index of refraction of n2, and $\theta$ max indicates a maximum value of the angle $\theta$ in the curved surface of the micro-lens, the micro-lens array is provided so that the light from the light source is directed to the micro-lens from the side of the medium having the index of refraction of n1, an image display device which modulates the light from the micro-lens array in accordance with the image signal is provided on a side of a surface, from which the light is projected, of the micro-lens array, and the respective micro-lenses of the micro-lens array are provided so as to correspond to the respective pixels of the image display device, and each micro-lens is provided so as to converge the light from the light source to a aperture section of its corresponding pixel.

3. The image display apparatus as set forth in claim 1, further comprising:

light separation means for separating the light of the light source into respective light having wavelengths of red, green, and blue and for directing the respective light to the image display device at respective different angles, wherein the micro-lens array is provided between the light separation means and the image display device and is provided so that each of the micro-lenses constituting the micro-lens array corresponds to one of three pixel groups which correspond to the respective light having wavelengths of red, green, and blue.

4. A micro-lens array, comprising:

a micro-lens supporting substrate which has a plurality of micro-lens sections, on a first surface, each micro-lens section having a convex surface that becomes a micro-lens, and a cover glass bonded to the first surface of the micro-lens supporting substrate via a resin having an index of refraction which is smaller than that of the micro-lens section, the micro-lens supporting substrate being provided so that a second surface which is a surface opposite to the first surface is polished so as to have a predetermined thickness.

5. The micro-lens array as set forth in claim 4, wherein a thickness of the micro-lens supporting substrate is set so as to be equal to or less than a length between a surface of the lens and a point to which the light is converged by the micro-lens section.

6. The micro-lens array as set forth in claim 4, wherein an inequality of sin(θ max)≧(n4/n3) is satisfied, where n3 indicates an index of refraction of the micro-lens section, n4 indicates an index of refraction of the resin, θ max indicates a maximum angle between a plane-normal of a second surface of the micro-lens supporting substrate and a normal of a convex surface of the micro-lens section.

7. A micro-lens array, comprising:
   a micro-lens supporting substrate which has a plurality of micro-lens sections, on a first surface, each micro-lens section having a concave surface that becomes a micro-lens, and
   a cover glass bonded to the first surface of the micro-lens supporting substrate via a resin having an index of refraction which is greater than that of the micro-lens section,
   the cover glass being provided so that a surface, opposite to a surface which is bonded to the micro-lens supporting substrate, is polished so as to have a predetermined thickness.

8. A liquid crystal display device for use with a micro-lens array,
   the micro-lens array comprising:
      a micro-lens supporting substrate which has a plurality of micro-lens sections, on a first surface, each micro-lens section having a convex surface that becomes a micro-lens, and
      a cover glass bonded to the first surface of the micro-lens supporting substrate via a resin having an index of refraction which is smaller than that of the micro-lens section,
      the micro-lens supporting substrate being provided so that a second surface which is a surface opposite to the first surface is polished so as to have a predetermined thickness,
      an opposite substrate having at least a transparent conductive layer and an alignment layer and an active matrix substrate being provided on the second surface of the micro-lens supporting substrate so that they are combined with each other via a liquid crystal layer.

9. A liquid crystal display device for use with a micro-lens array,
   the micro-lens array comprising:
      a micro-lens supporting substrate which has a plurality of micro-lens sections, on a first surface, each micro-lens section having a concave surface that becomes a micro-lens, and
      a cover glass bonded to the first surface of the micro-lens supporting substrate via a resin having an index of refraction which is greater than that of the micro-lens section,
      the cover glass being provided so that a surface, opposite to a surface which is bonded to the micro-lens supporting substrate, is polished so as to have a predetermined thickness,
      the surface of the cover glass that has been polished having at least a transparent conductive layer and an alignment layer and an active matrix substrate being provided on a second surface, which is a surface opposite to the first surface of the micro-lens supporting substrate so that they are combined with each other via a liquid crystal layer.

10. A liquid crystal display apparatus of projection-type, comprising:
    a light source; and
    a micro-lens array to which the light of the light source is directed,
    the micro-lens array comprising:
       a micro-lens supporting substrate which has a plurality of micro-lens sections, on a first surface, each micro-lens section having a convex surface that becomes a micro-lens, and
       a cover glass bonded to the first surface of the micro-lens supporting substrate via a resin having an index of refraction which is smaller than that of the micro-lens section,
       the micro-lens supporting substrate being provided so that a second surface which is a surface opposite to the first surface is polished so as to have a predetermined thickness,
       the liquid crystal display apparatus of projection-type further comprising:
          a liquid crystal display device in which an opposite substrate having at least a transparent conductive layer and an alignment layer and an active matrix substrate are provided on the second surface of the micro-lens supporting substrate so that they are combined with each other via a liquid crystal layer;
          light incident means for directing the light to the micro-lens array from a side of the cover glass; and
          projection means for projecting the light from the liquid crystal display device.

11. A liquid crystal display apparatus of projection-type, comprising:
    a light source; and
    a micro-lens array to which the light of the light source is directed,
    the micro-lens array comprising:
       a micro-lens supporting substrate which has a plurality of micro-lens sections, on a first surface, each micro-lens section having a concave surface that becomes a micro-lens, and
       a cover glass bonded to the first surface of the micro-lens supporting substrate via a resin having an index of refraction which is greater than that of the micro-lens section,
       the cover glass being provided so that a surface, opposite to a surface which is bonded to the micro-lens supporting substrate, is polished so as to have a predetermined thickness,
       the liquid crystal display apparatus of projection-type further comprising:
          a liquid crystal display device in which the substrate of the cover glass that has been polished having at least a transparent conductive layer and an alignment layer and an active matrix substrate are provided on a second surface, which is a surface opposite to the first surface, of the micro-lens supporting substrate so that they are combined with each other via a liquid crystal layer;
          light incident means for directing the light to the micro-lens array from a side of the cover glass; and
          projection means for projecting the light from the liquid crystal display device.

* * * * *